US010734210B2

(12) United States Patent
Stewart

(10) Patent No.: US 10,734,210 B2
(45) Date of Patent: Aug. 4, 2020

(54) MASS SPECTROMETER AND OPERATING METHODS THEREFOR

(71) Applicant: Thermo Fisher Scientific (Bremen) GmbH, Bremen (DE)

(72) Inventor: Hamish Stewart, Bremen (DE)

(73) Assignee: Thermo Fisher Scientific (Bremen) GmbH (DE)

( * ) Notice: Subject to any disclaimer, the term of this patent is extended or adjusted under 35 U.S.C. 154(b) by 0 days.

(21) Appl. No.: 16/182,859

(22) Filed: Nov. 7, 2018

(65) Prior Publication Data

US 2019/0157057 A1 May 23, 2019

(30) Foreign Application Priority Data

Nov. 20, 2017 (GB) .................................. 1719222.0

(51) Int. Cl.

*H01J 49/42* (2006.01)
*G01N 30/72* (2006.01)
*H01J 49/06* (2006.01)
*H01J 49/16* (2006.01)
*H01J 49/00* (2006.01)
*H01J 49/04* (2006.01)
*H01J 49/40* (2006.01)

(52) U.S. Cl.

CPC ...... *H01J 49/0095* (2013.01); *H01J 49/0031* (2013.01); *H01J 49/0468* (2013.01); *H01J 49/4225* (2013.01); *H01J 49/4265* (2013.01); *H01J 49/40* (2013.01)

(58) Field of Classification Search

CPC ............... H01J 49/0095; H01J 49/0031; H01J 49/0468; H01J 49/4255; H01J 49/40

USPC ................................ 250/281, 282, 283, 288

See application file for complete search history.

(56) References Cited

U.S. PATENT DOCUMENTS

| | | | | |
|---|---|---|---|---|
| 7,145,139 | B2 | 12/2006 | Syka | |
| 7,425,699 | B2 | 9/2008 | Makarov et al. | |
| 9,312,114 | B2 | 4/2016 | Hock et al. | |
| 2002/0100870 | A1* | 8/2002 | Whitehouse ........... | B82Y 30/00 250/281 |
| 2002/0127566 | A1* | 9/2002 | Hirabayashi ......... | C12Q 1/6827 435/6.11 |

(Continued)

FOREIGN PATENT DOCUMENTS

| | | | |
|---|---|---|---|
| GB | 2460506 | A | 12/2009 |
| GB | 2506710 | A | 4/2014 |

(Continued)

*Primary Examiner* — Nicole M Ippolito

(74) *Attorney, Agent, or Firm* — Thomas F. Cooney

(57) ABSTRACT

A method of injecting analyte ions into a mass analyser comprises: injecting analyte ions of a first charge and counter ions of a second charge into an ion trap; cooling the analyte ions and the counter ions simultaneously in the ion trap such that a spatial distribution of the analyte ions therein is reduced; and injecting the analyte ions as an ion packet from the ion trap into the mass analyser. A mass spectrometer controller is configured to: cause an ion source to inject an amount of analyte ions of a first charge and an amount of counter ions of a second charge into an ion trap; cause the ion trap to simultaneously cool the analyte ions and the counter ions in the ion trap, thereby reducing a spatial distribution of the analyte ions therein; and cause the ion trap to inject the analyte ions into a mass analyser.

30 Claims, 12 Drawing Sheets

(56) References Cited

U.S. PATENT DOCUMENTS

| | | | | |
|---|---|---|---|---|
| 2006/0255261 | A1 | 11/2006 | Whitehouse et al. | |
| 2007/0262252 | A1 | 11/2007 | Dowell | |
| 2009/0127453 | A1 * | 5/2009 | Ding .................. | H01J 49/4295<br>250/282 |
| 2011/0186724 | A1 | 8/2011 | Nolting et al. | |
| 2014/0353491 | A1 | 12/2014 | Hager et al. | |
| 2015/0155150 | A1 | 6/2015 | Bateman et al. | |

FOREIGN PATENT DOCUMENTS

| | | | |
|---|---|---|---|
| WO | 2010/002819 | A1 | 1/2010 |
| WO | 2011/095465 | A2 | 8/2011 |
| WO | 2013171313 | A1 | 11/2013 |

* cited by examiner

MASS SPECTROMETER AND OPERATING METHODS THEREFOR

CROSS-REFERENCE TO RELATED APPLICATION

This application claims the priority benefit under 35 U.S.C. § 119(a) to British Patent Application No. 1719222.0, filed on Nov. 20, 2017, the disclosure of which is incorporated herein by reference.

TECHNICAL FIELD

The present disclosure relates to mass spectrometers and methods of mass spectrometry. In particular, the present disclosure relates to methods and apparatus for injecting ions into a mass analyser.

BACKGROUND

Mass spectrometry is an important technique in the field of chemical analysis. In particular, mass spectrometry may be used to analyse and identify organic compounds. The analysis of organic compounds using mass spectrometry is challenging as organic compounds can range in mass from tens of amu up to several hundred thousand amu.

In general, a mass spectrometer comprises an ion source for generating ions, various lenses, mass filters, ion traps/storage devices, and/or fragmentation device(s), and one or more mass analysers. Mass analysers may utilise a number of different techniques for separating ions of different masses for analysis. For example, ions may be separated temporally by a Time of Flight (ToF) mass analyser, spatially by a magnetic sector mass analyser, or in frequency space by a Fourier transform mass analyser such as an orbital trapping mass analyser.

For orbital trapping mass analysers and ToF mass analysers, ions to be analysed may be grouped as ion packets prior to injection into the mass analyser. An extraction trap may be provided in order to form an ion cloud (ion packet) of analyte ions to be analysed with a suitable space and energy distribution for injection into an orbital trapping or ToF mass analyser. Examples of injecting ions into mass analysers using extraction traps are disclosed in U.S. Pat. Nos. 7,425,699 and 9,312,114.

Known extraction traps utilise a combination of potential and pseudopotential wells in order to confine analyte ions within the extraction trap. When confining analyte ions in an extraction trap, Coulombic repulsion, or space charge, between the trapped analyte ions opposes the confining forces of the applied potential and pseudopotential wells. As the number of trapped analyte ions increases, the potential resulting from the space charge increases. This space charge potential opposes the confining potential of the extraction trap. As the space charge potential approaches that of the potential well depth, the spatial distribution of the analyte ions in the ion trap increases rapidly. Large spatial distributions of analyte ions are undesirable, as this may negatively affect the transmission and/or resolution of the mass analyser.

SUMMARY

The present disclosure seeks to address problems arising from space charge effects associated with the trapping of ions. In particular, the present disclosure seeks to provide an improved extraction trap for a mass analyser with reduced or eliminated space charge related effects.

According to a first aspect of the disclosure, a method of injecting analyte ions into a mass analyser is provided. The method includes injecting analyte ions of a first charge into an ion trap, injecting counter ions of a second charge into the ion trap, cooling the analyte ions and the counter ions simultaneously in the ion trap such that a spatial distribution of the analyte ions in the ion trap is reduced, and injecting the analyte ions as an ion packet from the ion trap into the mass analyser. The presence of the counter ions in the extraction trap, in particular mixed with the analyte ions, results in a reduction of the spatial distribution of the analyte ions confined in the ion trap. The spatial distribution of the analyte ions may be reduced by one or more mechanisms described in more detail below.

By reducing the spatial distribution of the analyte ions within the ion trap, position related aberrations resulting from a large spatial distribution of ions may be reduced in the extraction trap. Accordingly, analyte ions may be ejected from the extraction trap into a mass analyser with increased accuracy, for example with a reduced spatial and/or temporal spread. Thus, the percentage transmission of the analyte ions from the ion trap into a mass analyser may be increased as a result of the reduced spatial distribution.

In particular, when the ion trap is arranged to inject ions into an orbital trapping mass analyser, the analyte ion packet may be focused through a narrow slit a few hundred micrometres wide. So, by decreasing the spatial distribution of the ion packet as it is cooled in the in trap through a reduction in the space charge, the ion packet may be more easily injected through the narrow slit. Thus, the percentage transmission of ions into the orbital trapping mass analyser may be increased.

Further, when the ion trap is arranged to inject ions into a TOF mass analyser, the spatial distribution of the ion packet will affect the resulting energy spread of the detected ions. By reducing the spatial distribution of analyte ions in the ion trap, the resulting spread in the energy of the ions detected by the TOF may be reduced. Thus, by reducing the spatial distribution of analyte ions in the ion trap by reducing or eliminating space charge effects, the resolution of the TOF mass analyser may be increased.

A first mechanism for reducing the spatial distribution of the analyte ions in the ion trap is by a reduction in the space charge in the ion trap. As such, the method according to the first aspect of the disclosure may provide an ion trap (extraction trap) which simultaneously traps both analyte ions of one charge and counter ions of an opposing charge. Accordingly, the total charge density in the ion trap is reduced as the counter ion charge balances out the analyte ion charge to an extent, i.e. reduces a net charge within the ion trap due to the analyte ions. As such, the resulting space charge of the analyte ions in the ion trap may be reduced. Advantageously, by reducing the space charge of the analyte ions, the spatial distribution of the analyte ions in the trap may be reduced. Moreover, a greater number of analyte ions may be trapped and stored in the extraction trap for ejection to a mass analyser, which can improve the transmission, signal-to-noise or the duty cycle of the mass analyser.

Preferably, the ion trap into which the analyte ions and counter ions are injected is a linear ion trap. The ion trap may comprise an elongate multipole electrode assembly arranged to define an ion channel into which the analyte ions and the counter ions are injected. The multipole electrode assembly is generally elongated in the direction of major elongation of the ion trap. In particular, the ion trap may be a rectilinear (R-trap) or curved linear ion trap (C-trap). Preferably, the multipole electrode assembly may comprise a quadrupole electrode assembly, a hexapole electrode assembly or an octupole electrode assembly. The elongate multipole electrode assembly may be used to confine ions in a radial direction.

Preferably, the analyte ions are axially confined within the elongate ion channel by a first potential well. Preferably, the counter ions are axially confined within the elongate ion channel by a second potential well. The first and second potential wells may be applied in the axial direction of the ion trap/elongate ion channel. The first and second potential wells may be provided with respect to a DC potential of the multipole electrode assembly. Accordingly, an ion trap for injecting a packet of analyte ions into a mass analyser may be provided which simultaneously confines analyte and counter ions of opposing charges in an ion channel in order to reduce the effect of space charge on the analyte ions. Preferably, the ion trap allows the counter ions to mix with the analyte ions.

Preferably, the analyte ions may be radially confined within the ion channel by a pseudopotential well by applying an RF oscillating potential (an RF potential) to the elongate multipole electrode assembly. For example, an RF potential may be applied to elongate electrodes of the multipole electrode assembly. There may be four such elongate electrodes in the case of a quadrupole electrode assembly, six such electrodes in a hexapole electrode assembly or eight such electrodes in an octupole electrode assembly. The elongate electrodes are arranged radially about the elongate ion channel. The counter ions may also be radially confined within the ion channel by the pseudopotential well provided by the RF potential applied to the elongate multipole assembly.

The analyte ions may be axially confined within a central region of the ion channel by applying a first DC bias to at least one first electrode arranged adjacent a central region of the ion channel. There are preferably one or two such first electrodes. Such first electrode(s) is (are) termed 'pin' electrode(s), which makes reference to its (their) shorter length in the axial direction compared to the length of the elongate electrodes of the multipole electrode assembly. The first electrode(s) may be elongate. The first electrode(s) may be aligned parallel with the elongate multipole electrode assembly. The at least one first electrode may be positioned between elongate multipole electrodes. The first electrode(s) may be positioned in a space between two elongate multipole electrodes of the multipole electrode assembly. The at least one first electrode generally is shorter than the elongate multipole electrodes. The axial length of the first electrode(s) may be less than half the length of the electrodes of the elongate multipole electrode assembly. As such, the first DC bias applied to a first electrode may define a first potential well with respect to the potential of the elongate multipole electrode assembly. The first electrode may be an electrode separate to the elongate multipole electrode assembly, or the first electrode may be provided as one segment, especially a central segment, of an axially segmented elongate multipole electrode assembly. The counter ions are confined within the ion channel by applying a second DC bias to second electrodes at opposing ends of the ion channel. As such, the second DC bias applied to the second electrodes may define a second potential well with respect to the potential of the elongate multipole electrode assembly. In order to confine the counter ions, the second potential well is of an opposite polarity to the first potential well. The first DC bias applied to the first (pin) electrode(s) may be approximately half or less of the second DC bias applied to the second (end) electrodes at opposing ends of the ion channel. The second electrodes may be provided as electrodes separate from the elongate multipole assembly, for example as end aperture plate electrodes positioned at either end of the multipole assembly, or the second electrodes may be provided as opposing end segments of a segmented elongate multipole electrode assembly. Accordingly, the analyte ions and the counter ions may be axially confined within the central region of the ion channel through the application of DC potentials only.

The analyte ions may be axially confined within a central region of the ion channel by applying RF potentials to end electrodes, i.e. electrodes at the axial ends of the ion trap, to create an axial RF pseudopotential well rather than an axial DC potential. Such an arrangement has been described in U.S. Pat. No. 7,145,139 for the purpose of facilitating electron transfer dissociation (ETD) reactions between opposing charged ions. Such an axial RF pseudopotential well may be used with applying a DC voltage or bias to an electrode arranged in a central region of the ion channel as described above. The analyte ions in this way may be axially confined within a central region of the ion channel by the DC potential. The RF axial pseudopotential may also be used to axially confine counter ions.

Preferably, the analyte ions are cooled in the ion trap prior to the injection of the counter ions. By cooling the analyte, ions prior to injection of the counter ions the analyte ions are at a lower average energy when the counter ions are reduced. Thus, the cooling time for the counter ions and the analyte ions in the ion trap once the counter ions are injected may be reduced. By reducing the cooling time required, the potential for ion interaction between the analyte ions and the counter ions may be reduced.

Preferably, the method according to the first aspect also includes a step of determining the number of analyte ions injected into the ion trap, wherein a number of counter ions to be injected into the ion trap is determined based on the determined number of analyte ions. By controlling the number of counter ions injected into the ion trap based on the number of analyte ions in the trap, the degree of reduction in space charge effects may be more accurately controlled.

Preferably, the counter ions injected into the ion trap have a mass to charge ratio (m/z) that is less than an average mass to charge ratio of the analyte ions, more preferably less than half, or less than a third, or less than a quarter of the average mass to charge ratio of the analyte ions. Preferably, the counter ions injected into the ion trap have a mass to charge ratio (m/z) of no greater than 200 amu. By providing counter ions with a maximum m/z of 200 amu, the counter ions may be confined by the second potential well in a more dense spatial distribution. Accordingly, by further reducing the spatial distribution of the counter ions, the spatial distribution reducing effect experienced by the analyte ions in the ion trap may be increased.

Preferably, the method according to the first aspect includes determining an average mass to charge ratio of the analyte ions to be injected into the ion trap, and if the average mass to charge ratio of the analyte ions is at least 2 times the mass to charge ratio of the counter ions, the number of counter ions to be injected into the ion trap is determined such that a total charge of the counter ions exceeds the total charge of the analyte ions. More preferably, the average mass to charge ratio of the analyte ions is at least: 3, 4, 5 or 6 times the mass to charge ratio of the counter ions. Advantageously, when analyte ions have a relatively high mass to charge ratio, the analyte ions are relatively weakly trapped by the pseudopotential. Thus, by providing counter ions of a relatively lower mass to charge ratio, which experience relatively stronger trapping, the confinement of the analyte ions is improved as the attractive space charge of the counter ions counteracts the space charge effects of the analyte ions. As such, the counter ions may act as a form of beneficial space charge, where the strong RF trapping forces on the relatively low m/z counter ions are transferred to the higher m/z analyte ions by their mutual attraction under space charge. Accordingly, the confinement of analyte ions in the ion trap is improved. Preferably, the total charge of the counter ions matches or substantially matches the total charge of the analyte ions in order to balance out the space charge effect.

Optionally, the first method of the first aspect may provide that the number of counter ions to be injected into the ion trap is determined such that a total charge of the counter ions is no greater than a total charge of the analyte ions. In some cases, providing excess counter ions may introduce additional space charge effects resulting from the excess of counter ions, thereby overwhelming the trapping pseudopotential and resulting in an expansion of the spatial distribution of the analyte ions in the ion trap.

A time period for cooling the analyte ions and the counter ions in the ion trap may be no greater than 2 ms. More preferably, a time period for cooling the analyte ions and the counter ions in the ion trap is no greater than: 1.75 ms, 1.5 ms, 1.25 ms, or 1 ms. By providing an upper limit for the cooling time period for the analyte ions and counter ions in the ion trap, the method ensures that the opportunity for reactions between the analyte ions and the counter ions to occur is limited, whilst still providing time for the ions to cool. Accordingly, the period for simultaneously trapping and cooling the analyte ions and counter ions in the ion trap is such that reactions, such as electron transfer dissociation (ETD) reactions, between the analyte ions and the counter ions is substantially avoided or is limited to a minor proportion. For example, the proportion of analyte ions that undergo a reaction during the period of simultaneous trapping and cooling may be less than 20% of the total number of the analyte ions. Preferably, the proportion may be less than 15%, 10% or more preferably less than 5% of the analyte ions such that the sensitivity of a subsequent mass analysis step is increased and/or maximised. Providing a period of pre-cooling of one or both types of ions before the ions are mixed in the extraction trap may reduce the cooling time subsequently needed once the analyte and counter ions are mixed in the trap, so reduce the opportunity for unwanted reaction. For example, the analyte ions may be introduced into the extraction trap first and cooled for a period before the counter ions are introduced into the extraction trap. The counter ions may even be cooled in an adjacent trap (such as a collision or fragmentation cell) and then quickly introduced in a cooled state into the extraction trap to mix with the analyte ions, which themselves have optionally been pre-cooled as described.

The analyte ions and counter ions may be injected into the ion trap from the same axial end of the ion trap. Preferably, the analyte ions are injected into the ion trap from one axial end of the ion trap, and the counter ions are injected into the ion trap from the other axial end of the ion trap. The ions may be injected into the ion trap from an axial end through an end aperture electrode, i.e. an end electrode positioned at an axial end of the ion trap and having an aperture to transmit ions therethrough. Preferably, there are provided end aperture electrodes at each axial end of the ion trap. By spatially separating the injection of the analyte ions into the ion trap from the injection of the counter ions into the ion trap, a time period between injecting the analyte ions and injecting the counter ions may be reduced, thereby allowing the method according to the first aspect to be performed in a shorter period of time.

Preferably, the analyte ions injected into the ion trap are generated by a first ion source, and the counter ions injected into the ion trap are generated by a second ion source. By generating the counter ions from a second ion source, the first and second ion sources may be operated independently. Accordingly, a time period between injecting the analyte ions into the ion trap and injecting the counter ions into the ion trap may be reduced or eliminated. As such, the counter ions may be injected into the ion trap at the same time (simultaneously) as the analyte ions. Preferably, the second ion source may be positioned such that counter ions may be injected into the ion trap from an opposing side (from an opposing axial end) of the ion trap to the side (end) where the analyte ions are injected.

A second mechanism for reducing the spatial distribution of the analyte ions in the ion trap is to cool the counter ions in the extraction trap by a laser cooling apparatus, which in turn cool the analyte ions by a transfer of kinetic energy. A laser cooling apparatus may cool the counter ions by a Doppler cooling process. Preferably, the counter ions for laser cooling are of a lower mass to charge ratio than the analyte ions. For example, the counter ions may be $Sr^+$ ions. As such, the counter ions may be rapidly cooled, thereby allowing relatively rapid cooling of the analyte ions. By rapidly cooling the analyte ions, the spatial distribution of the analyte ions may be decreased, such that the injection of the analyte ions into a mass analyser may be improved.

According to the second mechanism for reducing the spatial distribution of the analyte ions in the ion trap, the counter ions may be of the same charge or an opposing charge to the analyte ions. As such, the first and second mechanisms may be combined in a method for injecting analyte ions into a mass analyser according to the first aspect. Alternatively, a method according to the first aspect may use either the first or the second mechanism.

According to a second aspect of the disclosure, a mass spectrometer controller for controlling an ion trap to inject a packet of analyte ions from the ion trap into a mass analyser is provided. The controller is configured to cause at least one ion source to inject an amount of analyte ions of a first charge into the ion trap and to inject an amount of counter ions of a second charge into the ion trap. Preferably, the second charge is opposite to the first charge. The controller is configured to cause the ion trap to cool the analyte ions and the counter ions simultaneously in the ion trap in order to reduce the spatial distribution of the analyte ions in the ion trap, and further to cause the ion trap to inject the analyte ions from the ion trap into the mass analyser. As such, the mass spectrometer controller may be configured to implement the method according to the first aspect of the disclosure.

According to a third aspect of the disclosure, a mass spectrometer is provided. The mass spectrometer comprises a mass analyser, an ion trap, at least one ion source configured to inject analyte ions of a first charge into the ion trap and counter ions of a second charge into the ion trap, and a mass spectrometer controller according to the second aspect of the disclosure. Preferably, the second charge of the counter ions is opposite to the first charge. As such, the mass spectrometry apparatus according to the third aspect of the disclosure may be used to perform the method of the first aspect of the disclosure.

According to a fourth aspect of the disclosure a computer program comprising instructions to cause the mass spectrometer controller according to the second aspect or the mass spectrometry apparatus according to the third aspect to execute the steps of the method according to the first aspect is provided.

According to a fifth aspect of the disclosure a computer-readable medium having stored thereon the computer program according to the fourth aspect is provided.

The advantages and optional features for each of the first, second, third, fourth and fifth aspects of the disclosure as discussed above apply equally to each of the first second, third, fourth, and fifth aspects of the disclosure.

BRIEF DESCRIPTION OF THE DRAWINGS

The invention may be put into practice in a number of ways and specific embodiments will now be described by way of example only and with reference to the Figures in which.

DETAILED DESCRIPTION

Herein the term mass may be used to refer to the mass-to-charge ratio, m/z. The resolution of a mass analyser is to be understood to refer to the resolution of the mass analyser as determined at a mass to charge ratio of 200 unless otherwise stated.

Figure 1:
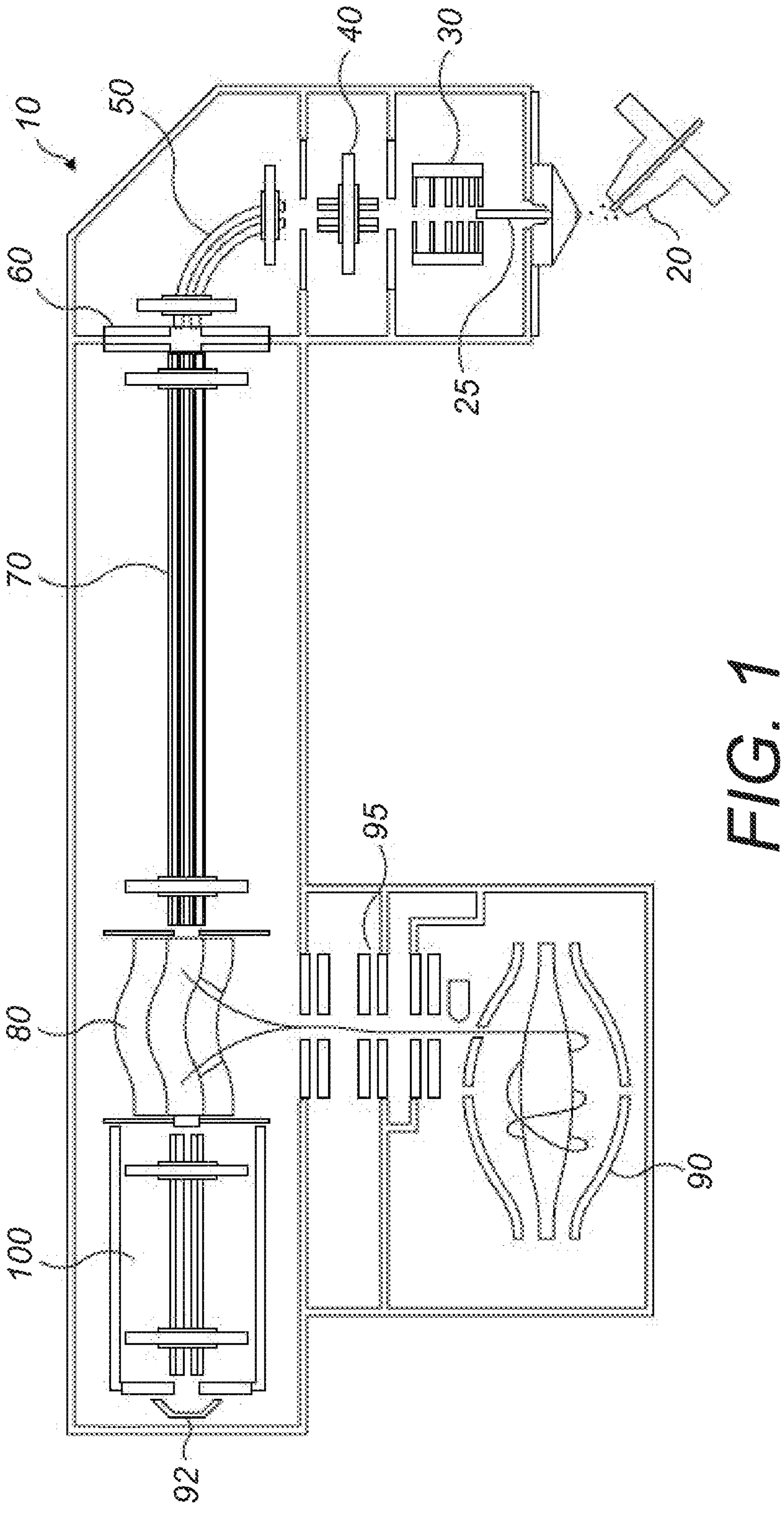
FIG. 1 shows a schematic arrangement of a mass spectrometer according to an exemplary embodiment of the present disclosure.

FIG. 1 shows a schematic arrangement of a mass spectrometer 10 suitable for carrying out methods in accordance with embodiments of the present disclosure.

In FIG. 1, an analyte to be analysed is supplied (for example from an autosampler) to a chromatographic apparatus such as a liquid chromatography (LC) column (not shown in FIG. 1). One such example of an LC column is the Thermo Fisher Scientific, Inc ProSwift monolithic column, which offers high performance liquid chromatography (HPLC) through the forcing of the analyte carried in a mobile phase under high pressure through a stationary phase of irregularly or spherically shaped particles constituting the stationary phase. In the HPLC column, analyte molecules elute at different rates according to their degree of interaction with the stationary phase. For example, an analyte molecule may be a protein or a peptide molecule.

The analyte molecules thus separated via liquid chromatography are then ionized using an electrospray ionization source (ESI source) 20 which is at atmospheric pressure to form analyte ions The analyte ions generated by the ESI source 20 are transported to the extraction trap 80 by ion transportation means of the mass spectrometer 10. According to the ion transportation means, analyte ions generated by the ESI source 20 enter a vacuum chamber of the mass spectrometer 10 and are directed by a capillary 25 into an RF-only S lens 30. The ions are focused by the S lens 30 into an injection flatapole 40 that injects the ions into a bent flatapole 50 with an axial field. The bent flatapole 50 guides (charged) ions along a curved path through it whilst unwanted neutral molecules such as entrained solvent molecules are not guided along the curved path and are lost. An ion gate 60 is located at the distal end of the bent flatapole 50 and controls the passage of the ions from the bent flatapole 50 into a transport multipole 70. In the embodiment shown in FIG. 1, the transport multipole is a transport octupole. The transfer multipole 70 guides the analyte ions from the bent flatapole 50 into an extraction trap 80. In the embodiment shown in FIG. 1, the extraction trap is a curved linear ion trap (C-trap). It will be appreciated that the above described ion transportation means is one possible implementation for transporting ions from an ions source to the extraction trap 80 according to the present embodiment. Other arrangements of ion transportation optics or variations of the above assembly, suitable for transporting ions from a source to an extraction trap will be apparent to the skilled person. For example, the ion transportation means shown in FIG. 1 could be modified or replaced by other ion optical components as required. For example, at least one of a mass selector, such as a quadrupole mass filter and/or a mass selecting ion trap and/or an ion mobility separator, could be provided between the bent flatapole 50 and the transfer multipole 70 to provide the capability to select ions from the ion source to be guided into the extraction trap.

The extraction trap is configured to confine and cool ions injected into it. The detailed operation and construction of the ion trap will be explained in more detail below. Cooled ions confined in the extraction trap are then ejected orthogonally from the extraction trap towards the mass analyser 90. As shown in FIG. 1, the first mass analyser is an orbital trapping mass analyser 90, for example the Orbitrap® mass analyser sold by Thermo Fisher Scientific, Inc. The orbital trapping mass analyser is an example of a Fourier Transform mass analyser. The orbital trapping mass analyser 90 has an off centre injection aperture in its outer electrode and the ions are injected into the orbital trapping mass analyser 90 as coherent packets, through the off centre injection aperture. Ions are then trapped within the orbital trapping mass analyser by a hyperlogarithmic electrostatic field, and undergo back and forth motion in a longitudinal (axial or z) direction whilst orbiting around the inner electrode.

The axial (z) component of the movement of the ion packets in the orbital trapping mass analyser is (more or less) defined as simple harmonic motion, with the angular frequency in the z direction being related to the square root of the mass to charge ratio of a given ion species. Thus, over time, ions separate in accordance with their mass to charge ratio.

Ions in the orbital trapping mass analyser are detected by use of an image current detector that produces a “transient” in the time domain containing information on all of the ion species as they pass the image detector. To provide the image current detector, the outer electrode is split in half at z=0, allowing the ion image current in the axial direction to be collected. The image current on each half of the outer electrode is differentially amplified to provide the transient. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the analyte ions are analysed by the orbital trapping mass analyser without fragmentation. The resulting mass spectrum is denoted MS1.

Although an orbital trapping mass analyser 90 is shown in FIG. 1, other Fourier Transform mass analysers may be employed instead. For example, a Fourier Transform Ion Cyclotron Resonance (FTICR) mass analyser may be utilised as mass analyser. Other types of electrostatic traps can also be used as Fourier Transform mass analysers. Fourier transform mass analysers, such as the orbital trapping mass analyser and Ion Cyclotron Resonance mass analyser, may also be used in the invention even where other types of signal processing than Fourier transformation are used to obtain mass spectral information from the transient signal (see for example WO 2013/171313, Thermo Fisher Scientific). In other embodiments, the mass analyser may be a time of flight (ToF) mass analyser. The ToF mass analyser may be a ToF having an extended flight path, such as multireflection ToF (MR-ToF) mass analyser.

In a second mode of operation of the extraction trap 80, ions passing through transport multipole 70 into the extraction trap 80 may also continue their path through the extraction trap to exit through the opposite axial end of the trap to the end through which they entered and into the fragmentation chamber 100. The transmission or trapping of ions by the extraction trap 80 can be selected by adjusting voltages applied to end electrodes of the extraction trap. As such, the extraction trap may also effectively operate as an ion guide in the second mode of operation. Alternatively, trapped and cooled ions in the extraction trap 80 may be ejected from the extraction trap in an axial direction into the fragmentation chamber 100. The fragmentation chamber 100 is, in the mass spectrometer 10 of FIG. 1, a higher energy collisional dissociation (HCD) device to which a collision gas is supplied. Analyte ions arriving into the fragmentation chamber 100 collide with collision gas molecules resulting in fragmentation of the analyte ions into fragment ions. The fragment ions may be returned from the fragmentation chamber 100 to the extraction trap 80 by an appropriate potential applied to the fragmentation chamber 100 and the end electrodes of the extraction trap 80. Fragment ions may be ejected from the extraction trap 80 into the mass analyser 90 for mass analysis. The resulting mass spectrum is denoted MS2. For MS2 scans, the transport octupole may also be used to mass filter the analyte ions prior to their injection into the extraction chamber 80 and fragmentation chamber 100. As such, the transport octupole may 70 may be a mass resolving octupole.

Although an HCD fragmentation chamber 100 is shown in FIG. 1, other fragmentation devices may be employed instead, employing such methods as collision induced dissociation (CID), electron capture dissociation (ECD), electron transfer dissociation (ETD), photodissociation, and so forth.

Figure 2:
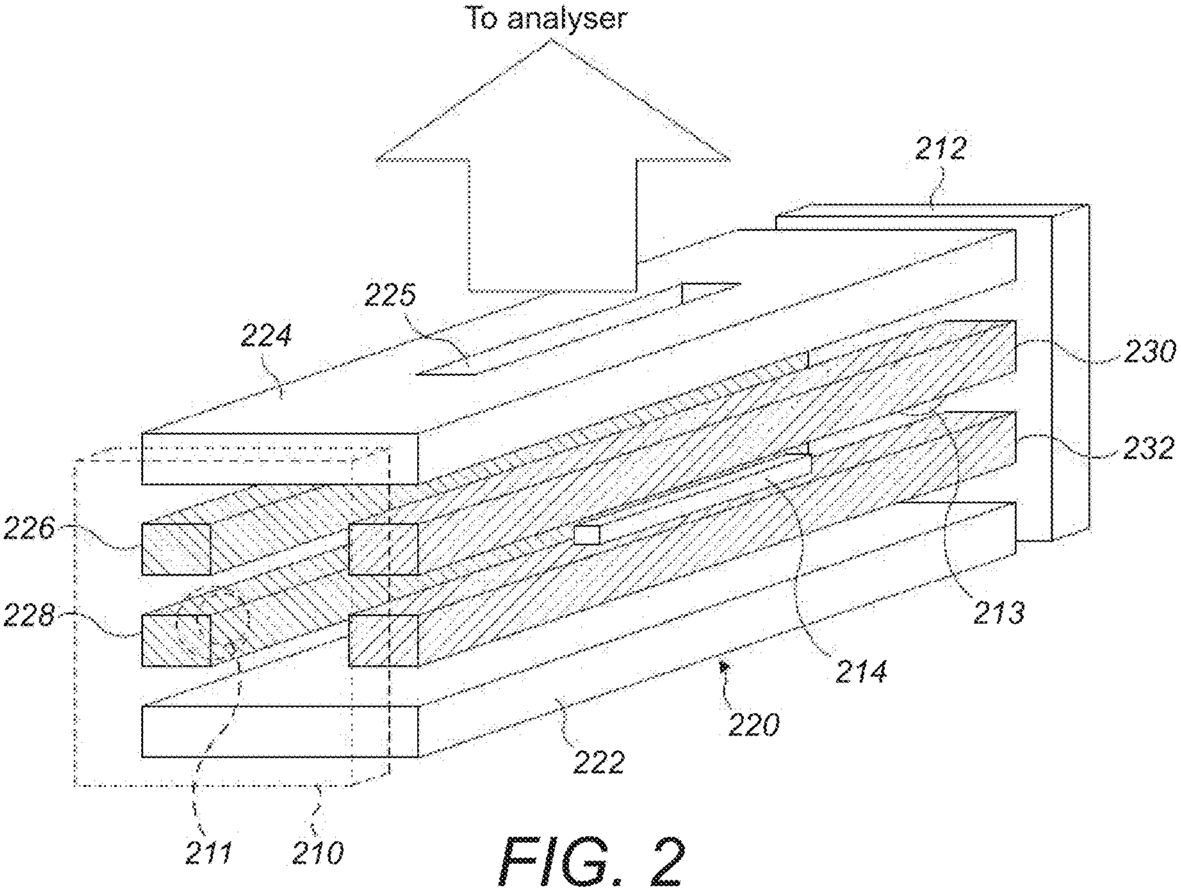
FIG. 2 shows a schematic diagram of an exemplary extraction trap suitable for carrying out methods according to this disclosure.

FIG. 2 shows a schematic diagram of an exemplary extraction trap 200 suitable for carrying out the method of this disclosure. The extraction trap 200 is of a rectilinear geometry. As such, the extraction trap 200 may be used in place of the extraction trap (C-trap) 80 shown in the mass spectrometer of FIG. 1. It will be understood that the extraction trap 200 may be provided in a curved form, for example as the C-trap 80 shown in FIG. 1.

FIG. 2 shows an extraction trap 200 comprising a first end electrode 210, a second end electrode 212, a pin electrode 214 and a multipole electrode assembly 220. The multipole electrode assembly and pin electrode 214 are arranged between the first end electrode 210 and the second end electrode 212. The first end electrode 210 and second end electrode 212 in this example are in the form of plate electrodes. Each of the first end electrode 210 and second end electrode 212 has an ion aperture 211, 213 provided centrally therein for transmission of ions therethrough. Ions for example may enter and/or exit the extraction trap 200 axially through the ion aperture 211 in the first end electrode 210. In some modes of operation, ions may enter and/or exit the extraction trap 200 axially through the ion aperture 213 in the second end electrode 212.

The multipole electrode assembly 220 shown in FIG. 2 includes a plurality of elongate electrodes arranged about a central axis to define an elongate ion channel. The multipole electrode assembly includes an elongate push electrode 222 and an opposing elongate pull electrode 224. The elongate push electrode 222 and the elongate pull electrode are spaced apart on opposing sides of the elongate ion channel and are aligned substantially in parallel with each other along the length of the elongate ion channel. As shown in FIG. 2, the elongate push electrode 222 and the elongate pull electrodes have substantially flat opposing surfaces. Alternatively, the opposing surfaces may have a hyperbolic profile.

The elongate pull electrode 224 includes a pull electrode aperture 225 at a point along its length. As shown in FIG. 2, the pull electrode aperture 225 is located in a relatively central region of the elongate pull electrode. The pull electrode aperture 225 runs through the thickness of the electrode and provides a path for ions to exit the extraction trap 200. In this way, the ions can be extracted from the extraction trap 200 towards and into the mass analyser.

The multipole electrode assembly also comprises first elongate split electrodes 226, 228 and second elongate split electrodes 230, 232. The first elongate split electrodes 226, 228 are spaced apart on an opposing side of the elongate ion channel to the second elongate split electrodes 230, 232 and are aligned substantially in parallel with each other along the length of the elongate ion channel. The first elongate split electrodes 226, 228 and second elongate split electrodes 230, 232 are spaced apart across the elongate ion channel in a direction which is perpendicular to the direction in which the elongate push electrode 222 and elongate pull electrode 224 are spaced apart in.

The first elongate split electrodes 226, 228 may be formed form two elongate rod-shaped electrodes. The two elongate rod electrodes are spaced apart such that an additional electrode may be provided between the two split electrodes, namely a second pin electrode that is thereby spaced apart on an opposing side of the elongate ion channel to the pin electrode 214. The two elongate rod-shaped electrodes may be aligned in parallel along the length of the elongate ion channel.

The second elongate split electrodes 230, 232 may also be formed from two elongate rod-shaped electrodes. As shown in FIG. 2, the two second elongate split electrodes 230 and 232 are spaced apart such that the pin electrode 214 is provided in the space between them. In an exemplary embodiment, the pin electrodes 214 are 1-10 mm long and <1 mm thick (approx. square section). This compares to the length of the first elongate split electrodes 226, 228 and the second elongate split electrodes 230, 232, which are typically 20 to 150 mm long.

As shown in FIG. 2, the elongate push electrode 222, the elongate pull electrode 224, the first elongate split electrodes 226, 228 and the second elongate split electrodes 230, 232 are arranged to form a quadrupole ion trap.

The elongate multipole electrode assembly 220 is provided to be capable of forming a pseudopotential well in the elongate ion channel. An RF varying potential may be applied to the pairs of elongate electrodes of the multipole electrode assembly to form the pseudopotential well. The RF potential applied to each pair of elongate electrodes in the elongate multipole electrode assembly 220 is shifted in phase with respect to other pairs of electrodes in the elongate multipole electrode assembly in order to provide an average radially confining pseudopotential. For example, in the embodiment of FIG. 2 featuring two pairs of elongate electrodes, the RF potential applied to the first pair of elongate electrodes 222, 224, is 180° out of phase with the RF potential applied to the second pair of elongate electrodes 226, 228. The elongate electrodes of the elongate multipole assembly may also have a DC potential applied to them. Preferably, the DC potential of the elongate electrodes is 0V. For example, according to one embodiment, the elongate multipole electrode assembly may be arranged to apply an RF potential to the elongate ion channel with an amplitude of at least 10 V, more preferably at least 50 V, and no greater than 10000 V, more preferably at least 5000 V, centred around 0 V. The RF potential oscillates at a frequency of at least 10 kHz and no greater than 10 MHz. Of course, the skilled person will appreciate that the exact RF potential amplitude and frequency may be varied depending on the construction of the elongate multipole electrode assembly and the ions to be confined.

The pin electrode 214 as shown in FIG. 2 is provided as an elongate electrode which is aligned substantially in parallel with both the elongate ion channel and the second elongate split electrodes 230, 232 and is positioned adjacent the elongate ion channel at a central region of the elongate ion channel.

Next, an exemplary embodiment of the method of injecting analyte ions into a mass analyser will be described with reference to the mass spectrometer 10 shown in FIG. 1 and the extraction trap 200 shown in FIG. 2.

The mass spectrometer 10 is under the control of a controller (not shown) which, for example, is configured to control the generation of ions in the ESI source 20, to set the appropriate potentials on the electrodes of the ion transport means described above so as to guide, focus and filter (where the ion transport means comprises a mass selector) the ions, to capture the mass spectral data from the Fourier transform mass analyser 90 and so forth. It will be appreciated that the controller may comprise a computer that may be operated according to a computer program comprising instructions to cause the mass spectrometer 10 to execute the steps of the method according to the present disclosure.

It is to be understood that the specific arrangement of components shown in FIG. 1 is not essential to the methods subsequently described. Indeed other mass spectrometer arrangements may be suitable for carrying out the method of injecting analyte ions into a mass analyser according to this disclosure.

According to the exemplary embodiment of the method, analyte molecules are supplied from a liquid chromatography (LC) column as part of the exemplary apparatus described above (as shown in FIG. 1).

In the exemplary embodiment of the method, the analyte molecules may be supplied from the LC column over a duration corresponding to a duration of a chromatographic peak of the sample supplied from the LC column. As such, the controller may be configured to perform the method within a time period corresponding to the width (duration) of a chromatographic peak at its base.

As shown in FIG. 1, an orbital trapping mass analyser (denoted "Orbitrap") is utilised to mass analyse the analyte molecules.

In order to mass analyse the analyte molecules, the analyte molecules from the LC column are ionized using the ESI source 20 to produce analyte ions. The ESI source 20 may be controlled by the controller to generate analyte ions with a first charge. The first charge may be a positive charge or a negative charge. According to the exemplary embodiment, the analyte ions are positively charged.

Analyte ions subsequently enter the vacuum chamber of the mass spectrometer 10. The sample ions are directed by through capillary 25, RF-only S lens 30, injection flatapole 40, and bent flatapole 50 and into the transport multipole 70 in the manner as described above.

Analyte ions then pass into the extraction trap 80 where they are accumulated. Accordingly, analyte ions of a first charge may be transported to, and injected into, extraction trap 80 according to the steps described above.

According to the exemplary embodiment, it is preferable that the number of analyte ions injected into the ion trap is determined. The number of analyte ions injected into the extraction trap may be determined in a number of ways. For example, in the mass spectrometer 10 shown in FIG. 1, an ion beam current of analyte ions may be measured by sampling an electrometer 92 mounted downstream of the extraction trap 80 and immediately downstream of fragmentation chamber 100. Thus, it can be inferred from said measured ion beam current the number of analyte ions injected into the ion extraction trap 80 for a given injection period. Alternatively, a small sacrificial sample of the analyte ions confined within the extraction trap 80 may be ejected into from the extraction trap 80 into the mass analyser 90 for a pre-scan process. The pre-scan process allows the mass analyser 90 to accurately determine the number of analyte ions within the packet. Together with knowledge of the injection time of the ions into the extraction trap 80, the ion current can be determined from the pre-scan. Thus, for a subsequent injection time into the extraction trap, the number of analyte ions and/or their total charge contained in the extraction trap 80 is determined. An example of a pre-scan process is described in US20140061460 A1. Other methods for counting analyte ions into the extraction trap may also be suitable depending on the mass spectrometer equipment arrangement.

Next, the control of the extraction trap 80 according to the exemplary embodiment of the method will be described in more detail with reference to the extraction trap 200 shown in FIG. 2.

In order to initially confine the injected analyte ions in the extraction trap 200 the controller is configured to apply an initial DC bias to the first end electrode 210 and the second end electrode 212. The DC bias to the first end electrode 210 is applied after the ions have entered the extraction trap 200 through the aperture shown in the first end electrode 210. The initial DC bias applied to the first and second end electrodes may be of the same charge as the analyte ions. In the exemplary embodiment, the controller is configured to apply a positive initial DC bias to the first end electrode 210 and the second end electrode 212. The initial DC bias applied to the first and second end electrodes 210, 212 acts to repel the analyte ions towards the central region of the elongate ion channel. As such, the analyte ions are initially axially confined by the initial DC bias applied to the first and second end electrodes 210, 212. For example, the initial DC bias applied to the first and second end electrodes 210, 212 may be +5 V.

The controller is also configured to apply an RF potential to the elongate multipole electrode assembly 220 of the extraction trap 200 such that a pseudopotential well is formed in the elongate ion channel. The pseudopotential well formed in the elongate ion channel radially confines the analyte ions within the elongate ion channel. The RF potential applied to the elongate multipole electrode assembly 220 is an oscillating potential applied across pairs of electrodes in the elongate multipole electrode assembly 220 in order to provide an average confining force in the radial direction for radially confining ions within the elongate ion channel. The amplitude of the oscillations may be varied depending on the range of the mass to charge ratios of the ions to be confined in the extraction trap 200. The elongate multipole assembly may also have an average DC bias potential applied to it in addition to the RF varying potential. In the present exemplary embodiment, the DC potential of the elongate multipole assembly is set to 0 V. The frequency of the RF potential according to the exemplary embodiment is 3 MHz, and the RF potential oscillates between −750 V and +750V.

Further, the controller is configured to apply a first DC bias to the pin electrode 214 (and to the second pin electrode (not visible in FIG. 2) located between the first elongate split electrodes 226, 228). The first DC bias applied to the pin electrodes may be provided independently to the DC potential of the multipole electrode assembly 220. The first DC bias applied to the pin electrode 214 is provided to confine the analyte ions in a central region of the elongate ion channel. Preferably, the first DC bias is of an opposing polarity to the initial DC bias, and thus of an opposing polarity to the analyte ions. The magnitude of the first DC bias applied to the pin electrode 214 may be less than the magnitude of the initial DC bias applied to the first and second end electrodes 210, 212. For example, the first DC bias may be −5 V.

By applying a first DC bias to the pin electrode 214 (with respect to the DC potential of the elongate multipole electrode assembly 220), a first potential well is formed in the central region of the elongate ion channel which confines the analyte ions in a central region of the elongate ion channel. As such, the first potential well is formed relative to the DC potential of the elongate multipole electrode assembly 220. The first potential well is formed relative to the DC potential of the elongate multipole electrode assembly 220. A magnitude of the first potential well may be defined as the energy required for an ion trapped at the bottom well to escape the well. A polarity of the potential well may be defined based on the polarity of the ions it is intended to confine. For example, a potential well with a negative polarity will confine positive ions, and a potential well with a positive polarity will confine negative ions.

The first potential well extends in the axial direction of the elongate ion channel of the extraction trap 200 in order to axially confine the analyte ions. The first potential well formed around the pin electrode 214 may also be formed with respect to the first and second end electrodes 210, 212. As such, the spatial distribution of the analyte ions within the extraction trap may be reduced by confining the analyte ions within a central region of the elongate ion channel by the first potential well. By confining the analyte ions in a first potential well by applying the first DC potential to the pin electrode 214, the initial DC bias applied to the first end electrode 210 and the second end electrode 212 may no longer be required to axially confine the analyte ions within the extraction trap 200. Accordingly, the positively charged analyte ions may be confined (axially confined and radially confined) within the elongate ion channel of the extraction trap 200 through a combination of the initial DC bias applied to the first and second end electrodes 210, 212, the first DC potential applied to the pin electrode(s) 214 and the RF potential applied to the multipole electrode assembly 220.

The method may pause for a pre-cooling time period once the analyte ions are confined within the first potential well to allow the analyte ions to cool within the extraction trap. Preferably, a pre-cooling time period is at least 0.1 ms. More preferably, the pre-cooling time period is at least 0.5 ms, 1 ms, or 1.5 ms. By pre-cooling the analyte ions, prior to the injection of the counter ions, the cooling time subsequently needed once the analyte ions and the counter ions are mixed in the trap may be reduced, thereby reducing the opportunity for unwanted reactions to occur.

Next, the controller is configured to cause a source of counter ions to generate counter ions for injection into the extraction trap. Preferably, the counter ions generated by the counter ion source are of a second charge opposite to the first charge of the analyte ions. For example, according to the exemplary embodiment shown in FIG. 1, the ESI source 20, operating with opposite polarity, may be used to generate counter ions of a second charge which is negative in the present example. The negatively charged counter ions may then be transported to the extraction trap 80 by the ion transportation means 25, 30, 40, 50, 60, 70 in a similar manner to the positive analyte ions, wherein any DC or axial polarities applied in the ion transportation means can be switched from to an opposing polarity from the method for transporting the positive analyte ions.

In some alternative embodiments, the counter ions may have their own dedicated source. For example, a source of counter ions may be provided as a second ESI source configured to inject counter ions into the ion transportation means 25, 30, 40, 50, 60, 70 such that the counter ions are injected into the ion trap from the same actual end as the analyte ions. Alternatively, the second ESI source may be positioned to inject counter ions into the extraction trap 80 from an opposing axial end of the extraction trap. For example, the second ion source could be positioned behind the fragmentation chamber 100 in FIG. 1 so that the counter ions could be transported through the fragmentation chamber 100 and into the extraction trap 80 from the opposing axial end of the extraction trap than the analyte ions. It will be appreciated that the controller may be configured to control the first and/or second ESI sources and any supporting ion transportation means in order to provide a sequence of analyte ion injections and counter ion injections into an extraction trap 80, 200 depending on the configuration of the ion transportation means according to the embodiments of this disclosure. By providing counter ions from a second, separate, ion source, the second ion source may be operated independently of the first ion source. Accordingly, a switchover time between generating analyte ions and counter ions may be reduced or eliminated such that the duration of the process of injecting the analyte ions and the counter ions into the extraction trap may be shortened.

Counter ions may be formed from a range of different molecules. For example, relatively low mass fused carbon rings like fluoranthene, anthracene, and phenanthrene may be used to form counter ions. For example, 9-anthracenecarboxylic acid (amongst others) may be ionised by an ESI source, and can then undergo in-source collisional decay, losing CO2, and become an anthracene ion which is an example of a suitable counter ion. Further details of such a process may be found in Mcluckey et al; Anal Chem. 2006 Nov. 1; 78(21): 7387-7391. Alternatively, counter ions may be formed from a glow discharge source. For example, fluoranthene molecules may be ionised using a glow discharge source in order to provide a source of counter ions.

Based on the number of analyte ions confined within the ion trap determined by one of the above measuring techniques the controller may be configured to adjust the number of counter ions to be injected into the extraction trap. Preferably, the controller is configured to inject a number of counter ions into the extraction trap such that the total charge of the counter ions balances out the total charge of the analyte ions. As such, the controller is configured to ensure that the net charge of the analyte ions and the counter ions in the extraction trap is approximately zero. By reducing the net charge of the ions within the extraction trap 200 the resulting space charge effects may be reduced and/or minimised. The controller is configured to control the number of counter ions to be injected into the extraction trap by controlling the source of the counter ions to generate a suitable number of counter ions and/or typically by controlling the length of the injection time of the counter ions into the extraction trap. For example, the controller may also be configured to determine an ion beam current of counter ions ejected from the source of counter ions in order to control the generation of a suitable number of counter ions and/or the counter ion injection time.

Preferably, the source of counter ions is configured to generate counter ions that have a mass to charge ratio of no greater than 300 or no greater than 250 or no greater than 200. The source of counter ions may be configured to generate counter ions having a mass to charge ratio of less than the mass to charge ratio of the analyte ions. It will be appreciated that ions with a relatively low mass to charge ratio experience increased spatial confinement by a potential well than ions with a higher mass to charge ratio. Thus, as a result of the relatively low mass to charge ratio of the counter ions, the spatial confinement of the counter ions within the extraction trap will be increased relative to the spatial confinement of the analyte ions. Thus, the attraction between the counter ions of a relatively low mass to charge ratio and the analyte ions of a relatively higher mass to charge ratio within the extraction trap will result in increased confinement of the analyte ions as a result of the increased confinement of the counter ions for a given potential well. As such, there will be a further reduction in the spatial confinement of the analyte ions as a result of the relatively lower mass to charge ratio of the counter ions within the extraction trap. This effect may be improved if the magnitude of the counter ion charge at least matches the magnitude of the analyte ion charge.

Preferably, an average mass to charge ratio of the analyte ions is at least two times the mass to charge ratio of the counter ions. More preferably, the mass to charge ratio of the analyte ions may be at least: 3, 4 or 5 times the mass to charge ratio of the counter ions. In one embodiment, where analyte ions of a relatively high mass to charge ratio are confined within the elongate ion channel, the number of counter ions to be injected into the extraction trap may be configured to provide a total charge of counter ions which exceeds the total charge of the analyte ions. By exceeding said charge, the confinement force provided by the relative low mass to charge ratio of the counter ions may act to provide an additional spatial charge reduction effect.

Next, according to the exemplary embodiment the counter ions are injected into the extraction trap 200 whilst the analyte ions are retained by the first potential well generated by the first DC bias applied to the pin electrode 214. The counter ions may be injected into the extraction trap 200 through one of the end electrodes 210, 212. In order to inject the counter ions, the initial DC bias applied to the end electrode through which the counter ions are injected is switched off, and a second DC bias of opposite polarity to the initial DC bias is applied to the opposite end electrode. Once all of the required counter ions have been injected, the second DC bias may be applied to both end electrodes to axially trap the counter ions therein. As such, a second potential well is defined by the second DC biases applied to the opposing second electrodes with respect to the elongate multipole assembly 220. The second potential well is provided to confine the counter ions within the second potential well. As such, the second potential well may confine the counter ions within a second volume within the elongate ion channel.

The second DC bias applied to both end electrodes is of the same polarity as the first DC bias applied to the central or pin electrode 214. In an exemplary embodiment, the first DC bias may be −5V and the second DC bias may be −10V. The first DC bias may be about half or less of the second DC bias. For multiply charged analytes, the DC barrier provided by the first potential well is multiplied, so that much lower pin electrode voltages may trap analyte ions but cause little or no impediment to interaction with singly charged counter ions.

Either or both of the initial DC bias or the second DC bias applied to the end electrodes may be augmented with an adjustable RF bias applied to the end electrodes such that an axial pseudopotential well can be created, which may improve the simultaneous axial trapping of the analyte and counter ions.

It will be understood that the oscillatory nature of the RF potential applied to the multipole electrode assembly 220 to radially confine the analyte ions will also be suitable for radially confining the counter ions. The counter ions are axially confined within the elongate ion channel by applying a second DC bias to the end electrodes 210, 212.

The second DC bias applied to the end electrodes 210, 212 may be of the same polarity as the counter ions. According to the exemplary embodiment, in which the counter ions are negative, the second DC bias applied to the first end electrode 210 and the second end electrode 212 is a negative bias. In order to force the counter ions towards the central region of the elongate ion channel the second DC bias is of a greater magnitude than the first DC bias applied to the pin electrode 214. Thus, both the analyte ions and the counter ions may be confined or urged towards a central region of the elongate ion channel such that the counter ions may interact with the analyte ions such that the spatial distribution of the analyte ions is reduced through a reduction in the space charge.

Figure 3:
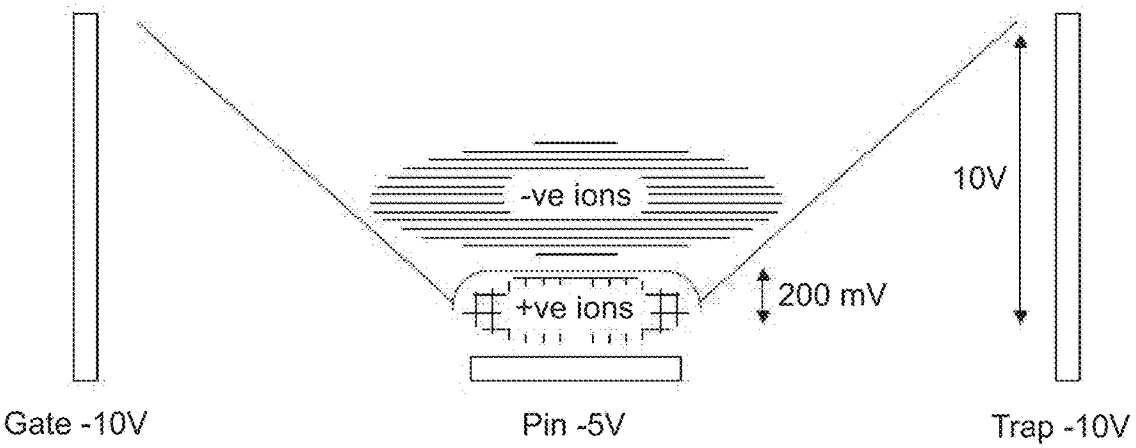
FIG. 3 shows a schematic diagram of the DC profile along the axial length of the extraction trap when counter ions and analyte ions are co-trapped within the elongate ion channel according to an embodiment of the disclosure.

FIG. 3 shows a schematic diagram of the DC profile along the axial length of the extraction trap when counter ions and analyte ions are co-trapped within the elongate ion channel according to an embodiment of the disclosure. As shown in FIG. 3, the positively charged analyte ions are confined within a first potential well centred around the pin electrode at a DC potential of −5V, whilst the negatively charged counter ions are confined within a second potential well, formed between axially opposing end electrodes at a DC potential of −10 V.

The extraction trap 200 according to the second exemplary embodiment may include a cooling gas. The pressure in the extraction trap 200 may be about $5\times10^{-3}$ mbar. The cooling gas interacts with the analyte ions and the counter ions in order to cause the analyte ions and or the counter ions to lose energy through interactions with the cooling gas. Accordingly, by interacting with the cooling gas the analyte ions and the counter ions may lose energy such that they cool and their spatial distribution is further reduced accordingly. Furthermore, during a cooling time period over which the ions cool the analyte ions may electrostatically interact with the counter ions such that the space charge distribution of the analyte ions reduces and/or balances out the space charge distribution of the counter ions. Accordingly, the net space charge present in the ion trap may be reduced.

Preferably the cooling time period for cooling the analyte ions and the counter ions within the extraction trap 200 (i.e. the period when both types of ions are present simultaneously in the trap) is no greater than 2 ms. It is preferable to place an upper limit on the cooling period time for the counter ions as the analyte ions within the ion trap to limit the potential for reactions between the analyte ions and the counter ions such as charge transfer reactions. More preferably the time period for cooling the analyte ions and the counter ions within the ion trap is no greater than: 1.5 ms, 1 ms, or 0.5 ms.

After the cooling time period, the controller is configured to apply a push DC bias to the elongate push electrode 222 and a pull DC bias to the opposing elongate pull electrode 224 in order to eject the analyte ions and the counter ions from the extraction trap 200. Preferably, the RF potential is not applied to the elongate multipole electrode assembly whilst ejecting the analyte ions and counter ions form the extraction trap 200. In the exemplary embodiment, the controller is configured to apply a negative bias to the pull electrode 224 (e.g. −500 Volts) and a positive DC bias (e.g. +500 Volts) to the push electrode 222. Accordingly, the positively charged analyte ions are ejected from the extraction trap through an aperture 225 provided within the elongate pull electrode 224, whilst the counter ions are forced in an opposing direction by the applied biases. Thus, the analyte ions may be separated from the counter ions and the analyte ions may be directed towards the mass analyser 90. By reducing the spatial distribution of the analyte ions prior to ejection from the extraction trap 200, the spatial distribution of the analyte ions as they are ejected from the extraction trap 200 may also be reduced. This results in an increased efficiency in transmission of the analyte ions (analyte ion packet) from the extraction trap 80 to the mass analyser 90 as the analyte ions may be more accurately focused.

According to the embodiment shown in FIG. 1, the analyte ions are ejected from the extraction trap 80 through a series of relatively narrow focussing lenses 95 and into a Fourier transform mass analyser 90. The skilled person will appreciate that the focussing lenses 95 have relatively narrow apertures that define a relatively narrow ion path to the mass analyser, which is around a few hundred microns in width. Thus, by reducing the spatial distribution of the analyte ions within the extraction trap 80 the proportion of ions that can be successfully focussed along the relatively narrow ion path and into the mass analyser 90 is increased, thereby resulting in an increase in transmission efficiency from the extraction trap 80 to the mass analyser 90.

With reference to the above method, it is to be understood that the first DC bias applied to the elongate pin electrode 214 forms a first potential well relative to the DC potential of the elongate multipole electrode assembly 220 for confining the analyte ions axially within the elongate ion channel. A second DC potential well is formed by the application of the second DC bias to the first and second end electrodes 210, 212 which confines the counter ions axially within the extraction trap 200. It will be appreciated that the present disclosure is not limited to the order of injection of the counter ions and the analyte ions into the extraction trap as described above according to the exemplary embodiment. As such, the counter ions may be injected into the extraction trap at a first time and confined by the first DC bias applied to the pin electrode 214 and the analyte ions injected at a second time period to be confined by the second DC bias applied to the first and second end electrodes 210, 212. Preferably, analyte ions are injected into the extraction trap at a first time to be confined by the first DC bias applied to the pin electrode 214 such that the analyte ions are located in a central region of the elongate ion channel, thereby improving the subsequent ejection of the analyte ions form the extraction trap.

It will be appreciated from the diagram of FIG. 2 that the extraction trap 200 includes at least 5 separate regions in which a DC bias may be applied in order to provide the first and second potential wells for confining ions within the extraction trap 200. For example, in FIG. 2, the five regions are the region defined by the first end electrode 210, the region defined by the elongate multipole electrode assembly between the first end electrode 210 and the pin electrode 214, the region defined by the pin electrode 214, the region defined by the elongate multipole electrode assembly 220 between the pin electrode 214 and the second end electrode 212, and the region defined by second end electrode. The DC biases applied to the first end electrode 210, the second end electrodes 212, and the pin electrode 214 may each be controlled independently of the DC potential of the elongate multipole electrode assembly 220 (and independently of each other).

Thus, methods according to the present disclosure may provide a first potential well applied in a central region of the elongate ion channel to confine a first set of ions and a second relatively deeper potential well formed by a bias applied to first and second end electrodes at opposing ends of the elongate ion channel to confine a second set of ions of an opposing charge such that the first and second set of ions interact with each other in a central region of the elongate ion channel in order to reduce the spatial distribution of the ions.

Figure 4:
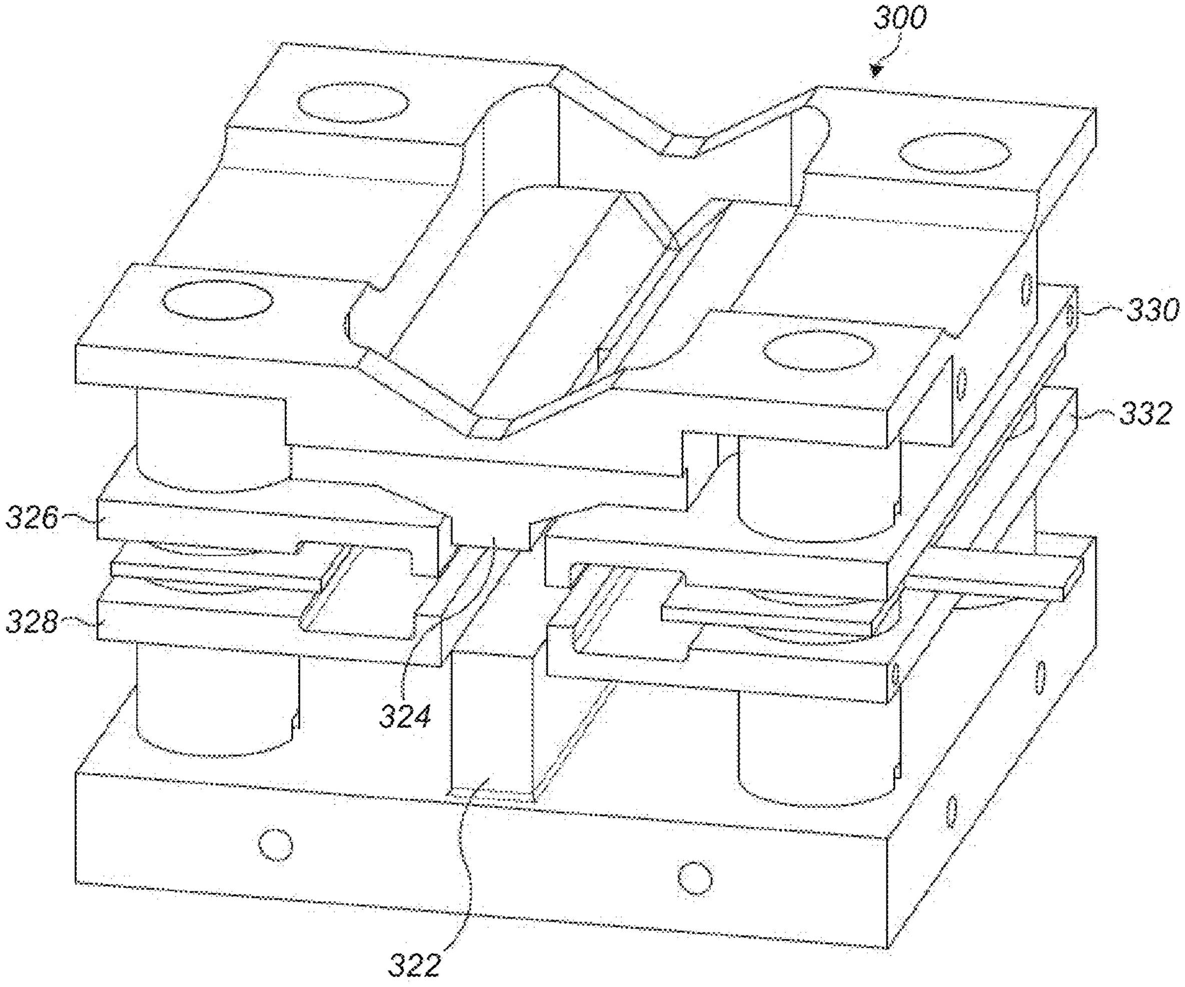
FIG. 4 shows a schematic diagram of an elongate multipole electrode assembly forming part of an extraction trap according to the present disclosure.
Figure 5A:
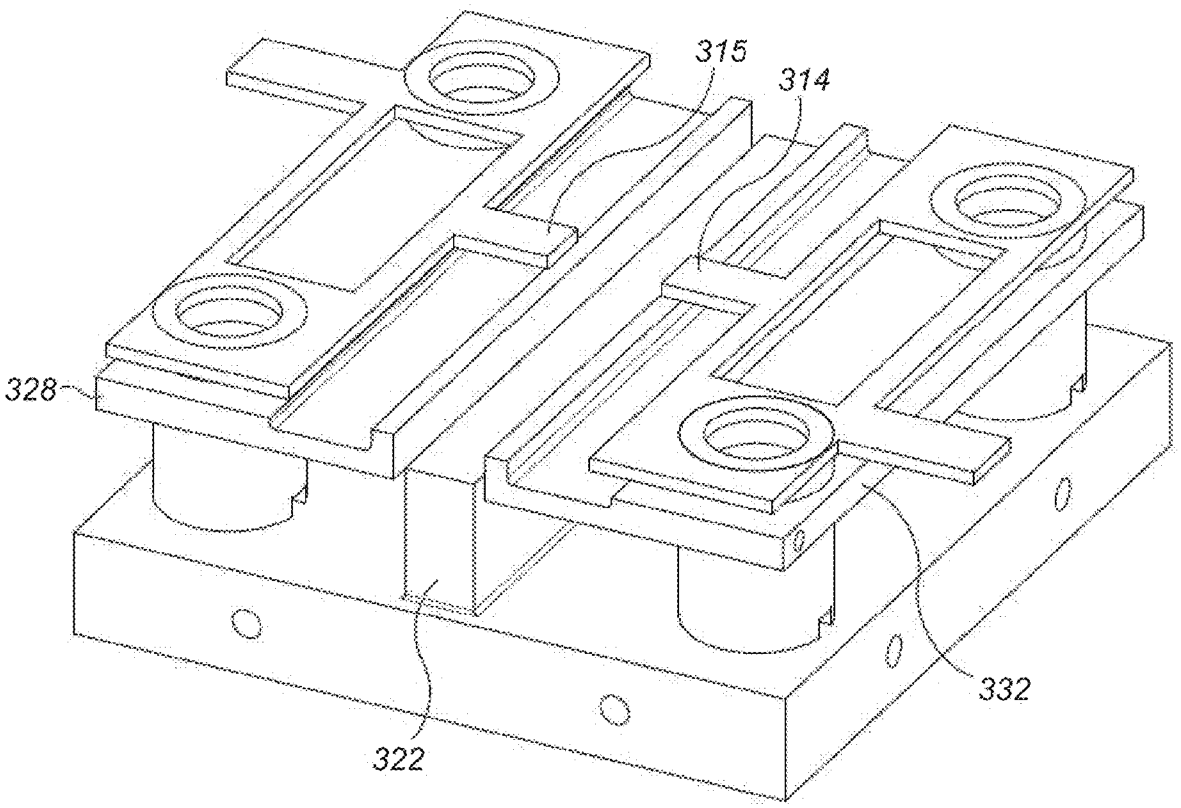
FIG. 5A shows a schematic diagram of the elongate multipole electrode assembly shown in FIG. 4 with an upper portion of the elongate multipole electrode assembly not shown.
Figure 5B:
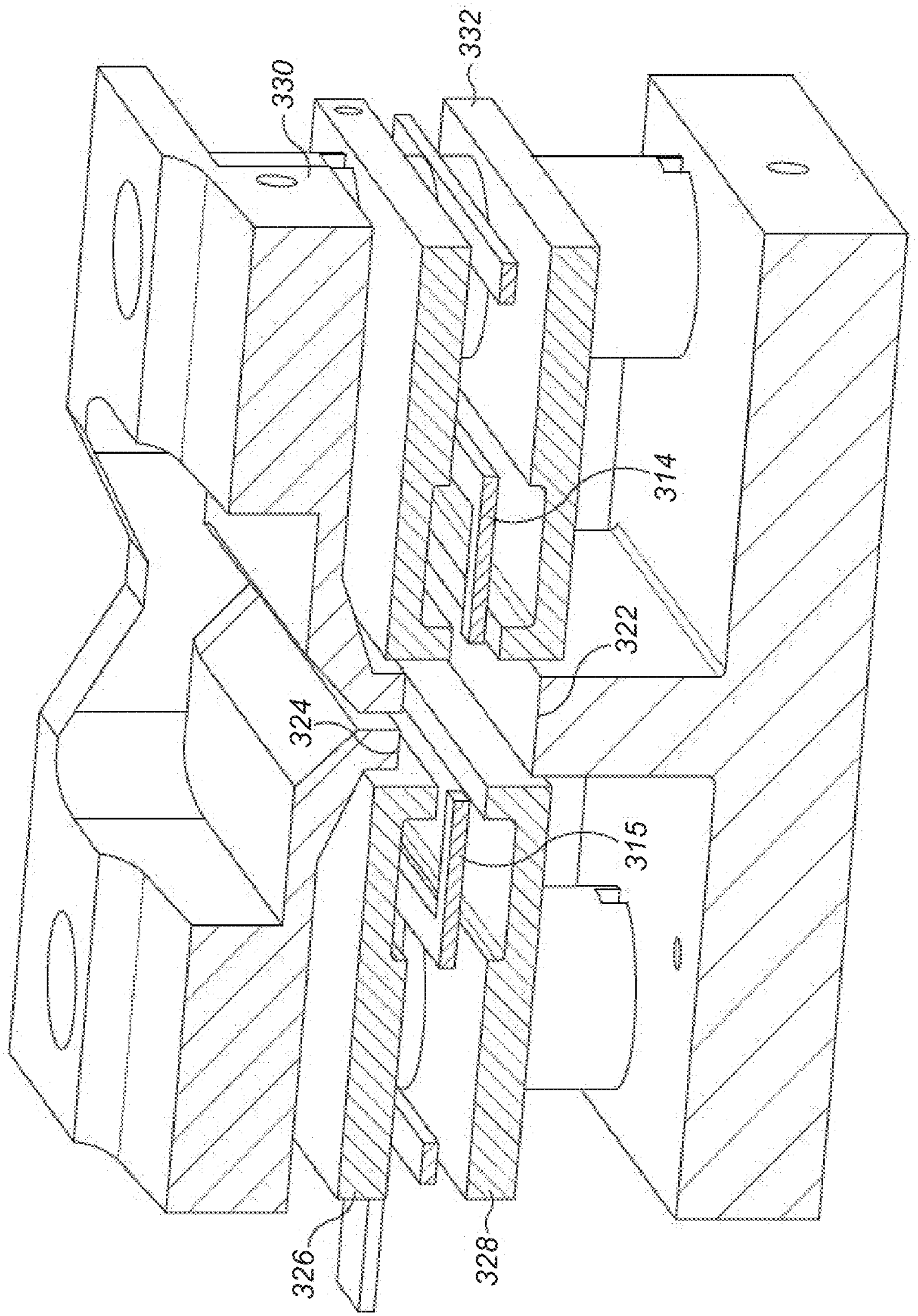
FIG. 5B shows a sectional view of the elongate multipole electrode assembly shown in FIG. 4 at a point along the axial length of the multipole electrode assembly.

FIG. 4 shows a schematic diagram of a multipole electrode assembly 300 forming part of an extraction trap according to a further embodiment of the present disclosure. FIG. 5A shows a schematic diagram of the multipole electrode assembly 300 shown in FIG. 4 with an upper portion of the multipole electrode assembly 300 not shown. FIG. 5B shows a sectional view of the multipole electrode assembly 300 at a point along the axial length of the multipole electrode assembly 300. The multipole electrode assembly 300 shown in FIGS. 4, 5A, and 5B includes an elongate push electrode 322, an opposing elongate pull electrode 324. The multipole electrode assembly 300 also includes a pair of pin electrodes 314, 315 spaced apart on opposing sides of the elongate ion channel, approximately an axially central region of the elongate ion channel. The multipole electrode assembly 300 also comprises a pair of first elongate split electrodes 326, 328 and a pair of second elongate split electrodes 330 and 332. The pair of pin electrodes 314, 315 are positioned respectively between the pair of first elongate split electrodes 326, 328 and the pair of second elongate split electrodes 330 and 332, i.e. the pin electrode 315 is located between the pair of first elongate split electrodes 326, 328 and the pin electrode 314 is located between the pair of first elongate split electrodes 330 and 332. As such, the multipole electrode assembly 300 shown in FIGS. 4, 5A, and 5B has a similar functionality to the elongate multipole electrode assembly 220 shown in the embodiment of FIG. 2. The embodiment shown in FIGS. 4, 5A, and 5B includes a pair of pin electrodes 314, 315, both of which may be biased with a first DC bias to form a first potential well for axially confining ions. It will be apparent that other variations of shapes of pin electrode may also be provided such that a first potential well may be provided in a central region of the elongate ion channel. For example, the pin electrodes may be provided as annular electrodes or there may be one, two, three, or four electrodes.

Figure 6:
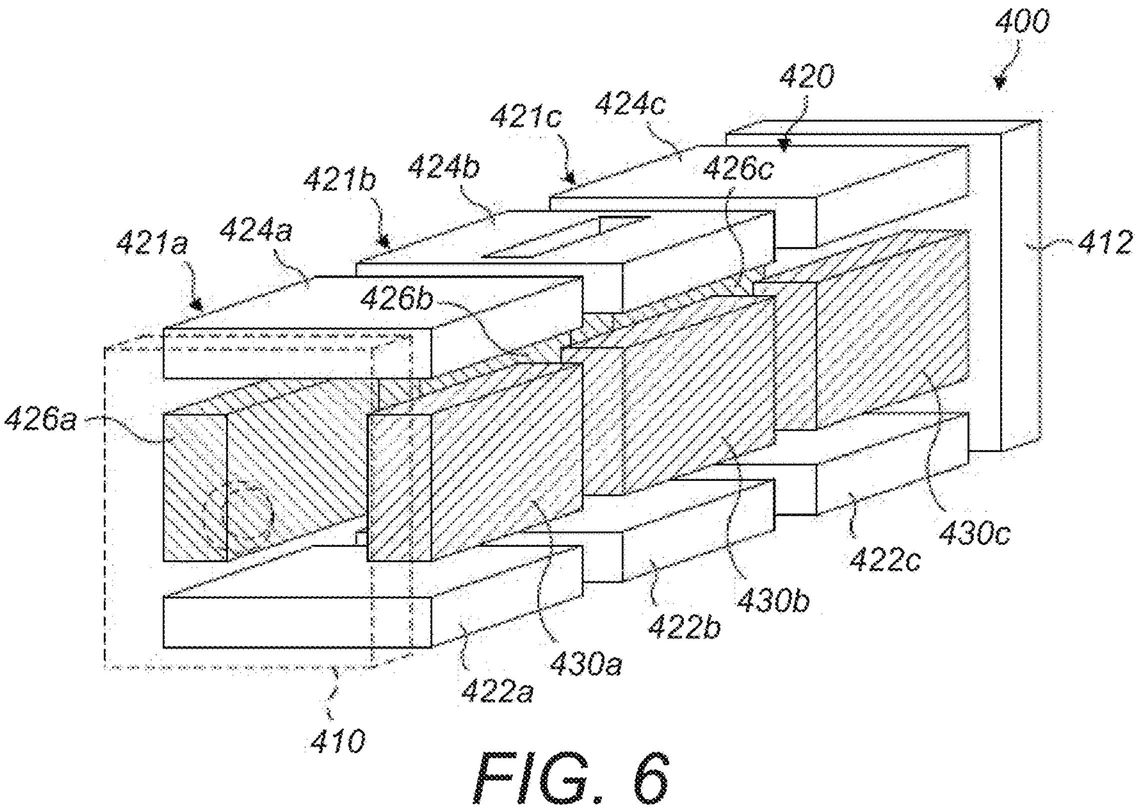
FIG. 6 shows a schematic diagram of an alternative extraction trap according to the present disclosure.

FIG. 6 shows a schematic diagram of an alternative extraction trap 400 according to the present disclosure. Similar to the extraction trap 200 shown in FIG. 2 the extraction trap 400 includes a first end electrode 410 and a second end electrode 412 having ion apertures therein.

The extraction trap 400 includes a segmented multipole electrode assembly 420. The segmented multipole electrode assembly includes three multipole electrode segments 421*a*, 421*b*, 421*c*. The three multipole electrode segments 421*a*, 421*b*, 421*c* may be arranged along an axis in order to define an elongate ion channel. Each multipole electrode segment includes a segmented pull electrode, a segmented push electrode a first segmented elongate electrode and a second segmented elongate electrode. As such, the segmented multipole assembly includes segmented pull electrodes 424*a*, 424*b*, and 424*c*, segmented push electrodes 422*a* 422*b* and 422*c*, first segmented elongate electrodes 426*a*, 426*b*, 426*c*, and second segmented elongate electrodes 430*a* 430*b* 430*c*.

The controller may be configured to apply an RF potential to the segmented multipole electrode assembly 420 such that a pseudopotential well is formed in the elongate ion channel for radially confining ions. The same RF potential may be applied to each of the three multipole electrode segments 421*a*, 421*b*, 421*c* in order to radially confine ions within the elongate ion channel of the extraction trap 400. As such, the segmented multipole electrode assembly 420 may be provided as a quadrupole electrode assembly in a substantially similar fashion to the multipole electrode assembly 220 as shown in FIG. 2 and as discussed above.

In contrast to the embodiment shown in FIG. 2, the extraction trap 400 of FIG. 6 does not include a DC pin electrode. Rather, the multipole electrode assembly 420 is segmented into three multipole electrode segments 421*a*, 421*b*, 421*c*. The controller may be configured to apply the first DC bias to a central multipole electrode segment 421*b* relative to a DC potential of the two outer multipole electrode segments 421*a*, 421*c* in order to provide a first potential well. The controller may be configured to apply the second DC bias to the first and second end electrodes 410, 412 in order to provide a second potential well, in a similar manner to the exemplary embedment shown in FIG. 2. As such, a DC bias may be applied independently to each of the multipole electrode segments 421*a*, 421*b*, 421*c*. In combination with the first and second end electrodes 410, 412, the extraction trap 400 according to this embodiment includes at least five separate independent regions in which an independent DC bias may be applied in order to confine ions within the extraction trap 400. Thus, the extraction trap 400 according to this embodiment may be configured to perform the same functionality as the extraction trap 200 as shown in FIG. 2.

Figure 7:
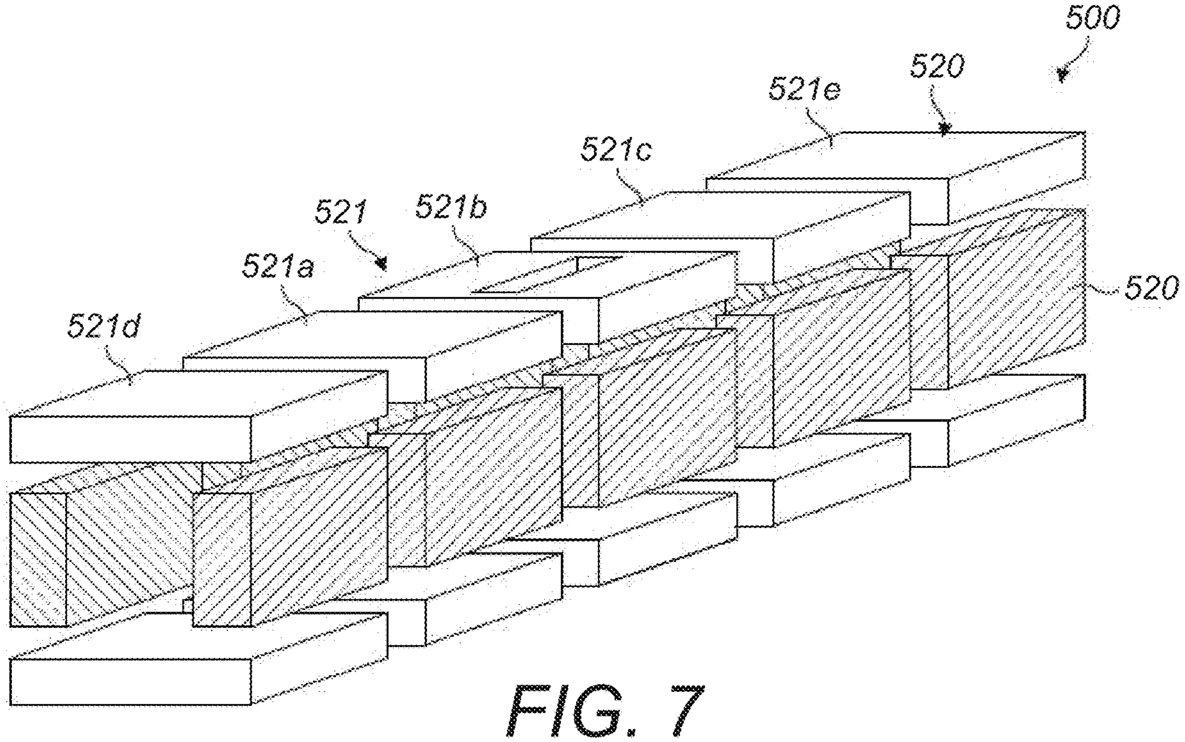
FIG. 7 shows a schematic diagram of a further alternative extraction trap according to the present disclosure.

A further alternative extraction trap 500 is shown in FIG. 7. The extraction trap 500 comprises a segmented multipole electrode assembly 520 including five multipole electrode segments 521*a*, 521*b*, 521*c*, 521*d*, 521*e*. The extraction trap 500 is similar to the extraction trap 400 as shown in FIG. 6 in that it includes a segmented multipole electrode assembly 520. A central portion 521 of the segmented multipole electrode assembly 520 includes three multipole electrode segments 521*a*, 521*b*, 521*c*, which are substantially the same as the central three multipole electrode segments of the segmented multipole electrode assembly 420 shown in FIG. 6. Further, the extraction trap 500 includes two additional multipole electrode segments 521*d*, 521*e* provided at opposing ends of the central portion 521. In comparison with the extraction trap shown in FIG. 6, the additional multipole electrode segments 521*d*, 521*e* are provided in place of the first and second end electrodes shown 410, 412. Thus, the initial DC bias and second DC bias described above may be applied to the end multipole electrode segments 521*d*, 521*e* in the manner described above to provide a similar potential well and trapping effect as the embodiments using end aperture electrodes such as 410, 412.

The controller may be configured to apply a DC bias to each of the segments independently of the other segments. As such, the extraction trap 500 includes at least 5 separate independent regions in which an independent DC bias may be applied in order to confine ions within the extraction trap 500. As such, the extraction trap 500 may be operated in a substantially similar way to the other extraction traps of this disclosure. The extraction trap 500 according to this embodiment may further include end electrodes (not shown) or other focussing type lenses for enabling ions to be injected and/or extracted from the extraction trap 500. Alternatively, the outermost segments of the segmented multipole electrode assembly 520 may be used to control the admission of ions into the extraction trap and the initial confinement of the ions within the extraction trap 500.

In an alternative embodiment of this disclosure, the analyte ions and the counter ions may be axially confined within a central region of the ion channel by applying RF potentials to end electrodes of an extraction trap, i.e. electrodes at the axial ends of the ion trap, to create an axial RF pseudopotential rather than an axial DC potential. Such an arrangement has been described in U.S. Pat. No. 7,145,139 for the purpose of facilitating electron transfer dissociation (ETD) reactions between opposing charged ions. As such, with reference to the mass spectrometer 10 according to this disclosure, a controller may be configured to apply an RF potential to end electrodes of an extraction trap 80, 200, 300, 400, (or opposing axial end multipole electrode segments 521*d*, 521*e*) to axially confine analyte ions and counter ions within an elongate ion channel. Such an axial RF potential may be used with applying a DC voltage or bias to an electrode arranged in a central region of the ion channel as described above. The analyte ions in this way may be axially confined within a central region of the ion channel by the DC potential. The counter ions may then be injected into the elongate ion channel and the axial RF potential applied in order to confine both the analyte ions and the counter ions.

Figure 8:
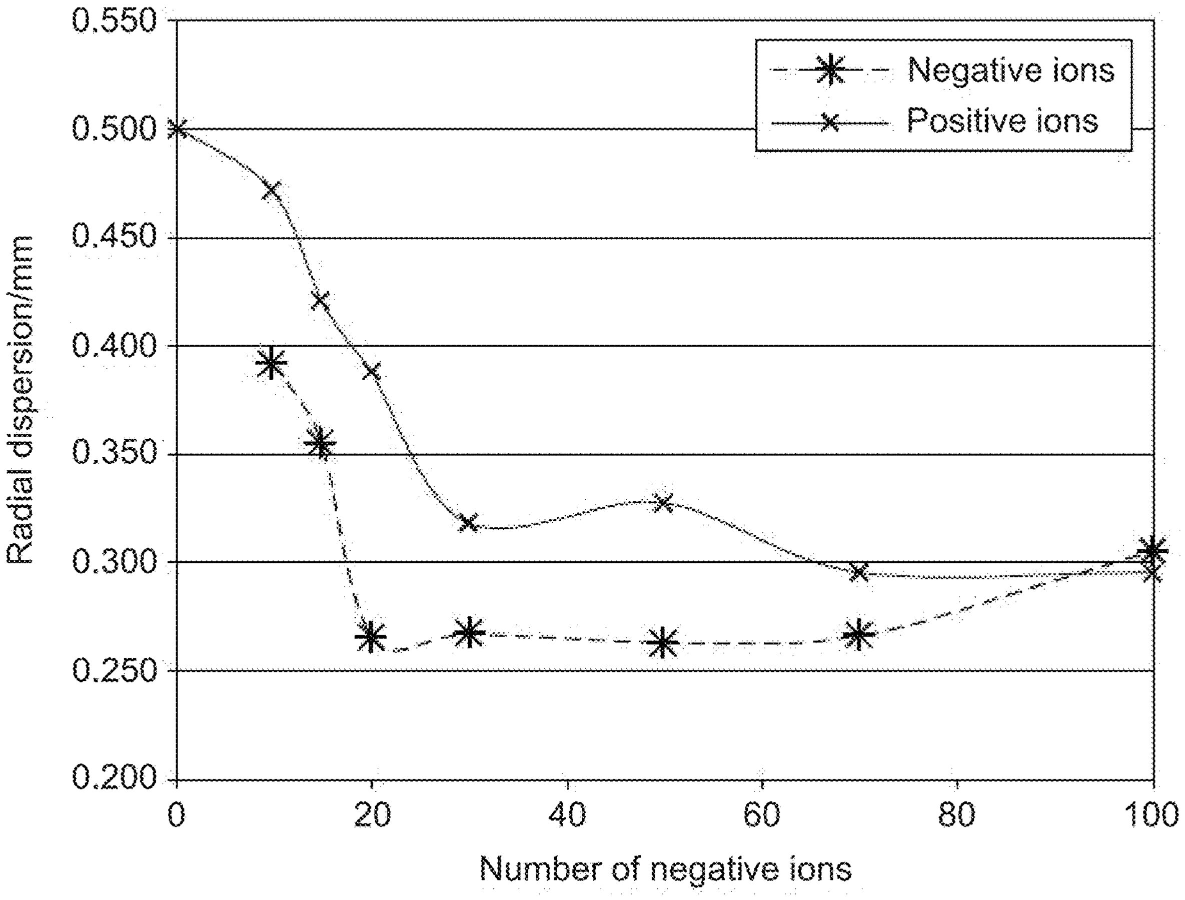
FIG. 8 shows a graphical result produced by a computer simulation showing the reduction in space charge in terms of the reduction of the radial dispersion of the ions in the extraction trap resulting from the method of injecting ions into a mass spectrometer according to the present disclosure.

FIG. 8 shows a graphical result produced by a computer simulation showing the reduction in space charge resulting from the method of injecting ions into a mass spectrometer according to the present disclosure. The simulation was generated in SIMION. The model was built incorporating a fixed number of 100 positive ions with a charge factor adapted making them equivalent to $1\times10^7$ charges with a mass to charge ratio of 250. The simulation models a rectilinear extraction trap with a 2.5 mm inscribed radius and a 12 mm length. A 500 V, 4 MHz RF potential was applied to the radial electrodes and a 1000 V, 1 MHz RF voltage was applied to the end caps to provide an axial potential.

As shown in FIG. 8 as the number of counter ions confined within the elongate ion channel is increased the radial distribution of the analyte ions decreases rapidly as does that of the co-trapped counter ions, which are of an opposing charge. Thus, the simulation results shown in FIG. 8 demonstrate the effect of the counter ions on the spatial distribution of the analyte ions within the elongate ion channel for reducing the spatial distribution of the analyte ions.

Figure 9:
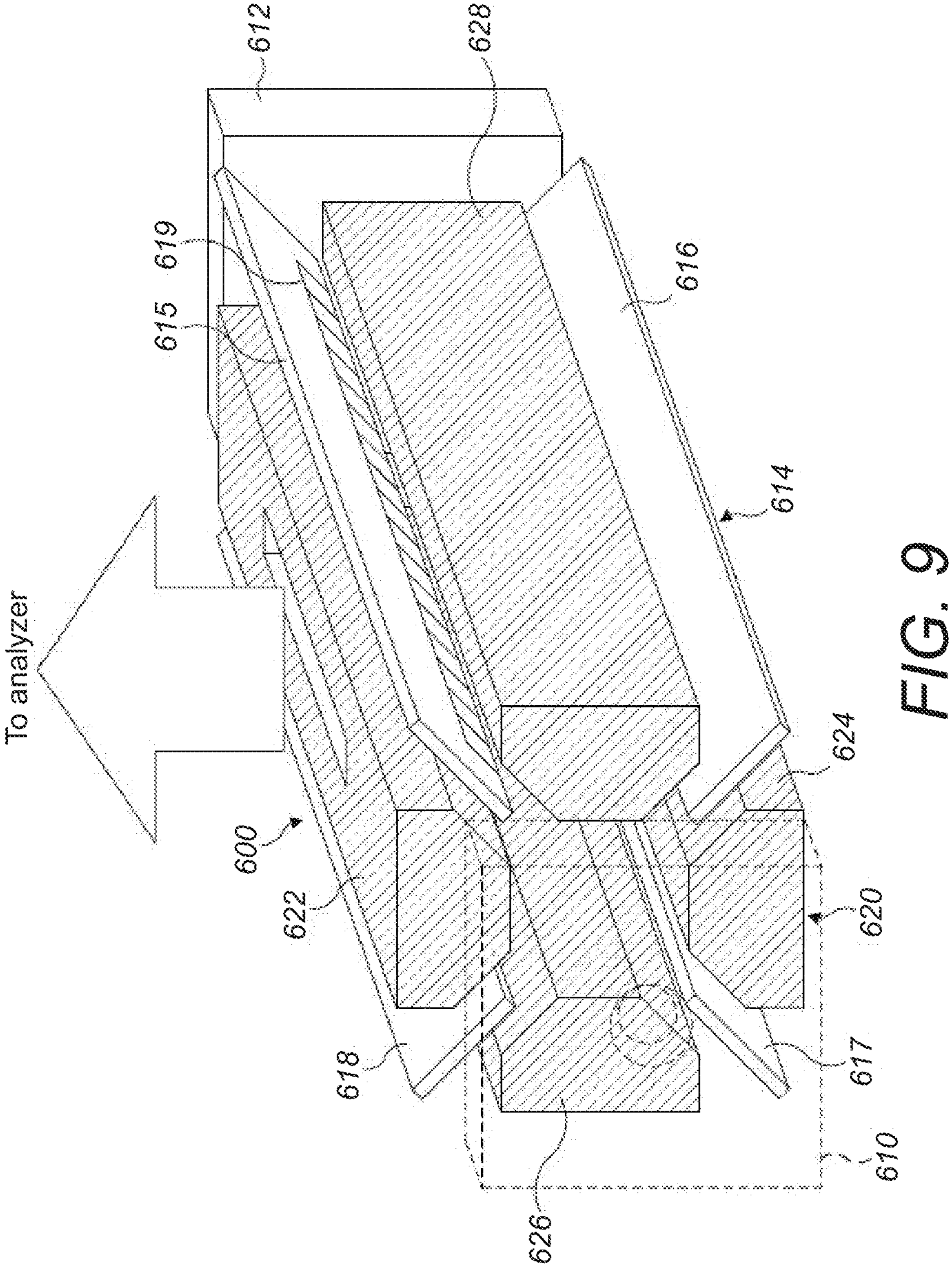
FIG. 9 shows a schematic diagram of a further alternative extraction trap incorporating a PCB electrode assembly according to the present disclosure.

FIG. 9 shows a schematic diagram of a further alternative extraction trap 600 incorporating a PCB electrode assembly 614 according to the present disclosure. Similar to the extraction trap 200 shown in FIG. 2 the extraction trap 600 comprises a first end electrode 610, a second end electrode 612, and an elongate multipole electrode assembly 620.

The elongate multipole electrode assembly 620 includes two pairs of elongate electrodes 622, 624, 626, 628. A first pair of elongate electrodes 622, 624 are spaced apart on opposing sides of the elongate ion channel and are aligned substantially in parallel with each other along the length of the elongate ion channel. A second pair of elongate electrodes 626, 628 are also spaced apart on opposing sides of the elongate ion channel and are aligned substantially in parallel with each other along the length of the elongate ion channel.

The extraction trap 600 also comprises an elongate PCB electrode assembly 614 as shown in FIG. 9. The elongate PCB electrode assembly 614 is provided as four elongate PCB boards 615, 616, 617, 618. The elongate PCB boards 615, 616, 617, 618 are aligned axially with the elongate multipole electrode assembly 620. The elongate PCB boards 615, 616, 617, 618 are provided in spaces provided between the elongate electrodes of the elongate multipole electrode assembly 620 as shown in FIG. 9.

Each elongate PCB board 615, 616, 617, 618 may comprise a plurality of electrodes 619 extending along a length of the elongate PCB board electrode aligned with the elongate ion channel (electrodes 619 are shown only on PCB board 615 in FIG. 9 but are provided on each PCB board 615, 616, 617, 618). As such, the plurality of electrodes 619 are positioned at least on a side of the elongate PCB board which is adjacent to, and extends along, the elongate ion channel of the extraction trap 600. The plurality of electrodes 619 may include a first electrode positioned in a substantially central region of the elongate PCB board and a pair of second electrodes positioned on opposing sides of the first electrode. The first and second electrodes may be spaced apart along the length of the elongate ion channel. The plurality of electrodes may include further electrodes spaced along the length of the elongate ion channel either side of the first and second electrodes. For example, as shown in FIG. 9, the elongate PCB board electrode 615 includes 27 electrodes spaced along the length of the PCB board electrode 615. Each electrode may be independently biased with a DC voltage. Preferably, a PCB board electrode includes at least 3 electrodes, at least 5 electrodes, at least 10 electrodes or more preferably at least 15 electrodes.

Each elongate PCB board 615, 616, 617, 618 may have the same configuration of the plurality of electrodes 619 described above. The electrodes of the elongate PCB boards 615, 616, 617, 618 may each provide a DC bias profile for the elongate ion channel. As such, only one elongate PCB board 615 may be sufficient for providing the DC bias profile for the elongate ion channel. More preferably, at least two elongate PCB boards are provided. Even more preferably, four elongate PCB boards are provided, especially when positioned between four elongate multipole rods of a quadrupole. Preferably, the elongate PCB boards are provided on opposing sides of the elongate ion channel in order to provide a DC bias profile that has an order of rotational symmetry about the elongate ion channel.

As such, both the central axial potential and/or the second surrounding axial potential well may be defined by one or more electrodes mounted to one or more PCBs that run down the outside of the ion channel. Although FIG. 9 below shows the extraction trap 600 incorporating PCB based electrodes mounted at the four corners between the multipole rods, though they may also be mounted between split electrodes to act as the pin electrode, for example as shown in FIG. 2. For the configuration where PCB boards are corner mounted, it is preferable that push and pull potentials can be applied to the PCB electrodes to produce a more homogenous extraction field.

Figure 10:
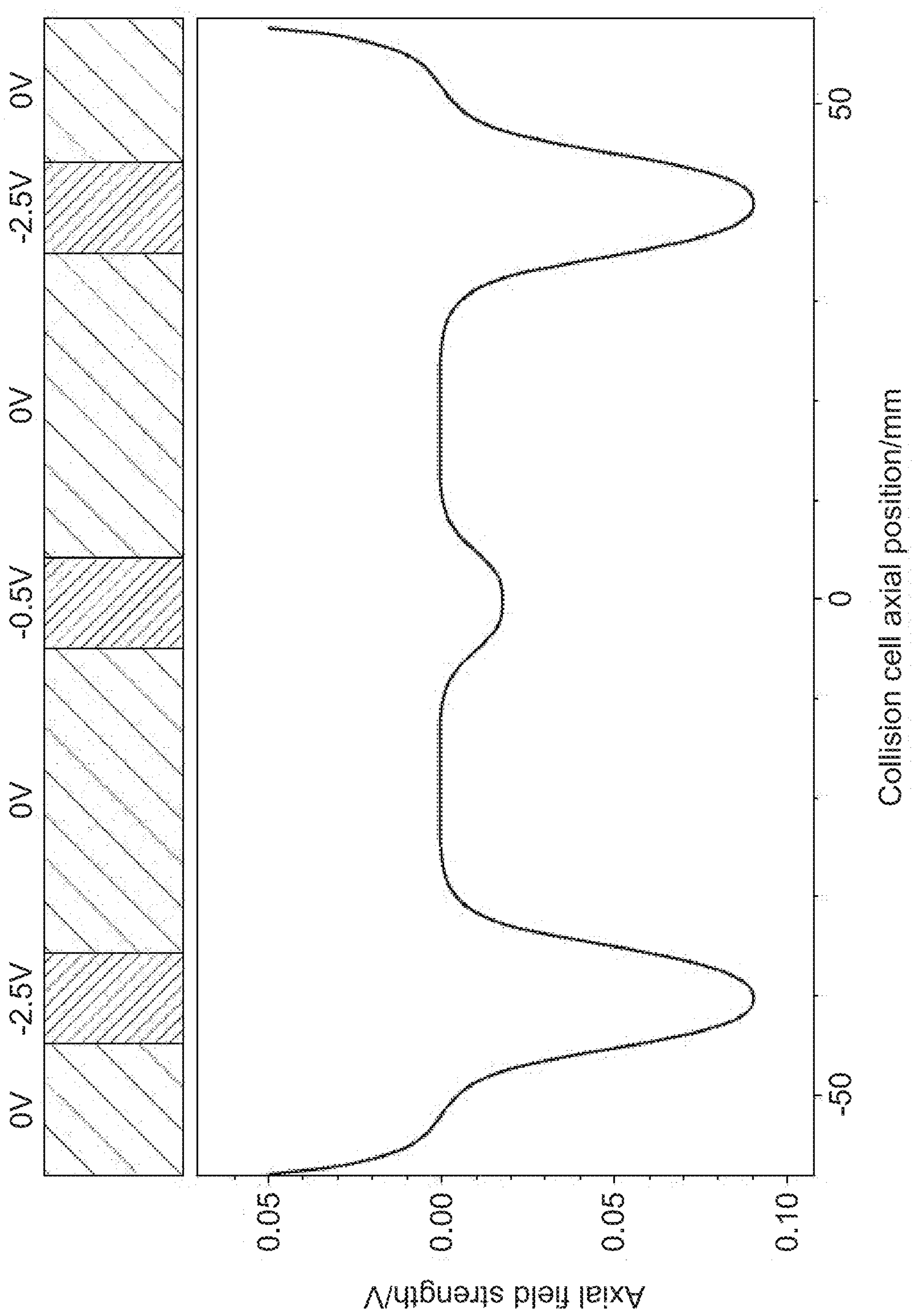
FIG. 10 shows an example of the DC bias profile that may be provided by a plurality of electrodes along the length of an elongate PCB board in the extraction trap of FIG. 9.

The controller may be configured to apply a DC bias to each of the plurality of electrodes 619 independently of the other electrodes of the plurality of electrodes. As such, the extraction trap 600 includes at least 5 separate independent regions in which an independent DC bias may be applied in order to confine ions within the extraction trap 600. As such, the extraction trap 600 may be operated in a substantially similar way to the other extraction traps of this disclosure. An example of the DC bias profile that may be provided by the plurality of electrodes 619 along the length of an elongate PCB board in the extraction trap 600 is shown in FIG. 10.

According to a further exemplary embodiment of this disclosure a method of injecting analyte ions into a mass analyser from an extraction trap incorporating a laser cooling process may be provided. According to this exemplary embodiment, a laser cooling process is used to rapidly cool counter ions. The rapidly cooled counter ions are then used reduce the kinetic energy (cool) of the analyte ions in order to reduce space charge effects experienced by the analyte ions. As such, the method according to this embodiment takes advantage of a space charge interaction between the kinetic energies of analyte ions and counter ions under which the kinetic energies of the counter ions and the analyte ions will equilibrate as a result of Coulombic interaction. As such, if a co-trapped ion is more efficiently cooled this will in turn cause them to also cool an accompanying analyte ion faster than would be expected from solely an interaction with a surrounding buffer gas.

The counter ions may be of a lower mass to charge ratio than the analyte ions. Counter ions of a relatively low mass to charge ratio may be more easily confined by an RF pseudopotential well, which may allow the counter ions to more efficiently cool the co-trapped analyte ions through the laser cooling process.

Some elemental and small molecular ions are amenable to laser cooling processes. One type of laser cooling process suitable for the present embodiment is a Doppler cooling process whereby the co-trapped counter ions may be irradiated with a laser energy at a frequency finely tuned to be slightly below the absorption peak of said counter ion. The Doppler effect causes variation in the probability of photon absorption depending on the direction of ion motion, resulting in photons transferring more momentum to ions when ions are moving against the beam direction, thereby producing a net cooling effect. A laser may be operated to provide a Doppler effect which allows low Kelvin temperatures to be achieved. As such, ions (counter ions) may be cooled far below room temperature whilst co-trapped in an extraction trap with analyte ions in order to improve the rate of cooling of the analyte ions. By increasing the rate of cooling of the analyte ions within the extraction trap, the space charge/spatial distribution of the analyte ions may be further reduced. Such a reduction in the spatial distribution of the analyte ions may be highly advantageous for improving the transmission of analyte ions into a mass analyser and/or improving the mass resolving power of a mass analyser. For example, the advantages may be particularly useful for improving the transmission of analyte ions and/or the mass resolving power of a Fourier transform mass analyser or a TOF mass analyser.

Figure 11:
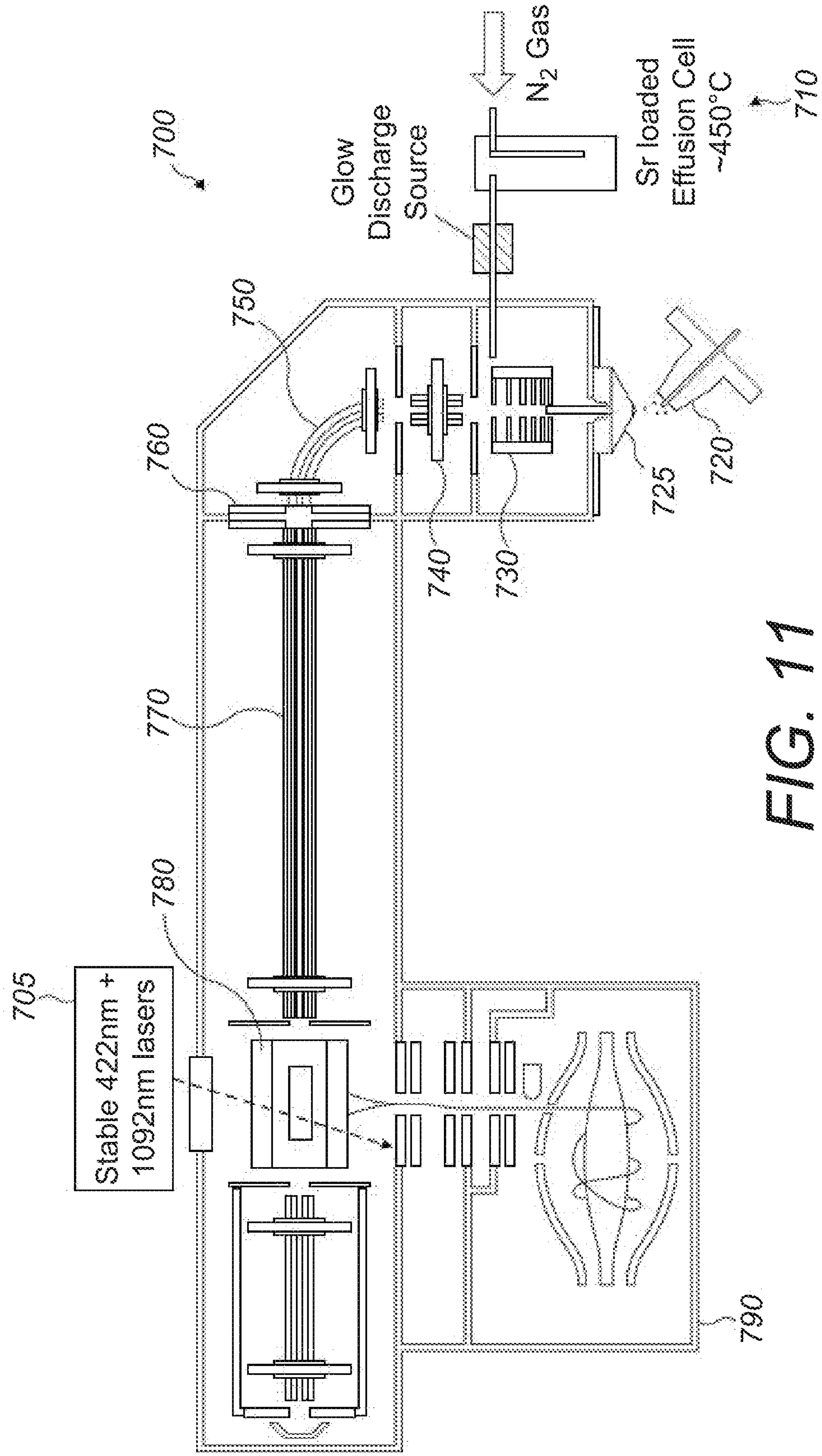
FIG. 11 shows a schematic diagram of a mass spectrometer incorporating a laser cooling apparatus according to an embodiment of the present disclosure.

FIG. 11 shows a schematic diagram of a mass spectrometer 700 incorporating a laser cooling apparatus 705. As shown in FIG. 11 the mass spectrometer 700 includes an ESI sprayer 720 acting as a source of analyte ions, a source of counter ions 710, and ion transportation means 725, 730, 740, 750, 760, 770 for transporting analyte ions and counter ions to an extraction trap 780 in a similar manner to the mass spectrometer 10 as shown in FIG. 1. As such, the ion transportation means mass include a capillary 725, an RF only S lens 730, an injection flatapole 740, a bent flatapole 750, an ion gate 760, and a transport octupole 770. The extraction trap 780 is configured to eject ions into a Fourier transformer mass analyser 790 in a similar manner to the configuration of the extraction trap 80 as shown in FIG. 1 and discussed above. The mass spectrometer 700 may be controlled by a controller (not shown) in a manner substantially as described for the other exemplary embodiments described above. As such, it will be understood that the mass spectrometer 700 may be operated to transport analyte ions from ESI sprayer 720 to the extraction trap 780 in a similar manner to the mass spectrometer 10 as described previously.

As further shown in FIG. 11 the mass spectrometer 700 also includes a source of counter ions 710. For example, the source of counter ions 710 may be a source of strontium ions provided by a strontium loaded fusion cell. The source of strontium ions may provide single positively charged strontium ions ($Sr^+$ ions) into the ion transportation means of the mass spectrometer 700 such that the strontium ions may be transported to the extraction trap 780 in a similar manner to the embodiments described above. It will be appreciated that strontium ions, in particular $Sr^+$ strontium ions are well suited for Doppler cooling by application of a laser with a radiation wavelength of approximately 422 nanometres.

The mass spectrometer 700 also includes a laser cooling apparatus 705 configured to transmit electromagnetic radiation through the extraction trap 780 in order to Doppler cool the counter ions confined within the elongate ion channel. For example, according to the embodiment shown in FIG. 11 the laser cooling apparatus 705 may include a diode laser configured to emit radiation with a wavelength of 422 nanometres, which is suitable for Doppler cooling of $Sr^+$ ions. Preferably, the laser cooling apparatus 705 also includes a further stabilising laser. The stabilising laser may be configured to quench metastable electronic states formed in the counter ions as a result of the Doppler cooling process. For example, the laser cooling apparatus 705 shown in FIG. 11 also includes a neodymium based laser which is configured to emit radiation with a wavelength of 1092 nanometres for quenching a metastable electronic state of the strontium ions which forms in a low proportion when the strontium ions are eradiated with the 422 nanometre radiation as part of the Doppler cooling process.

Figure 12:
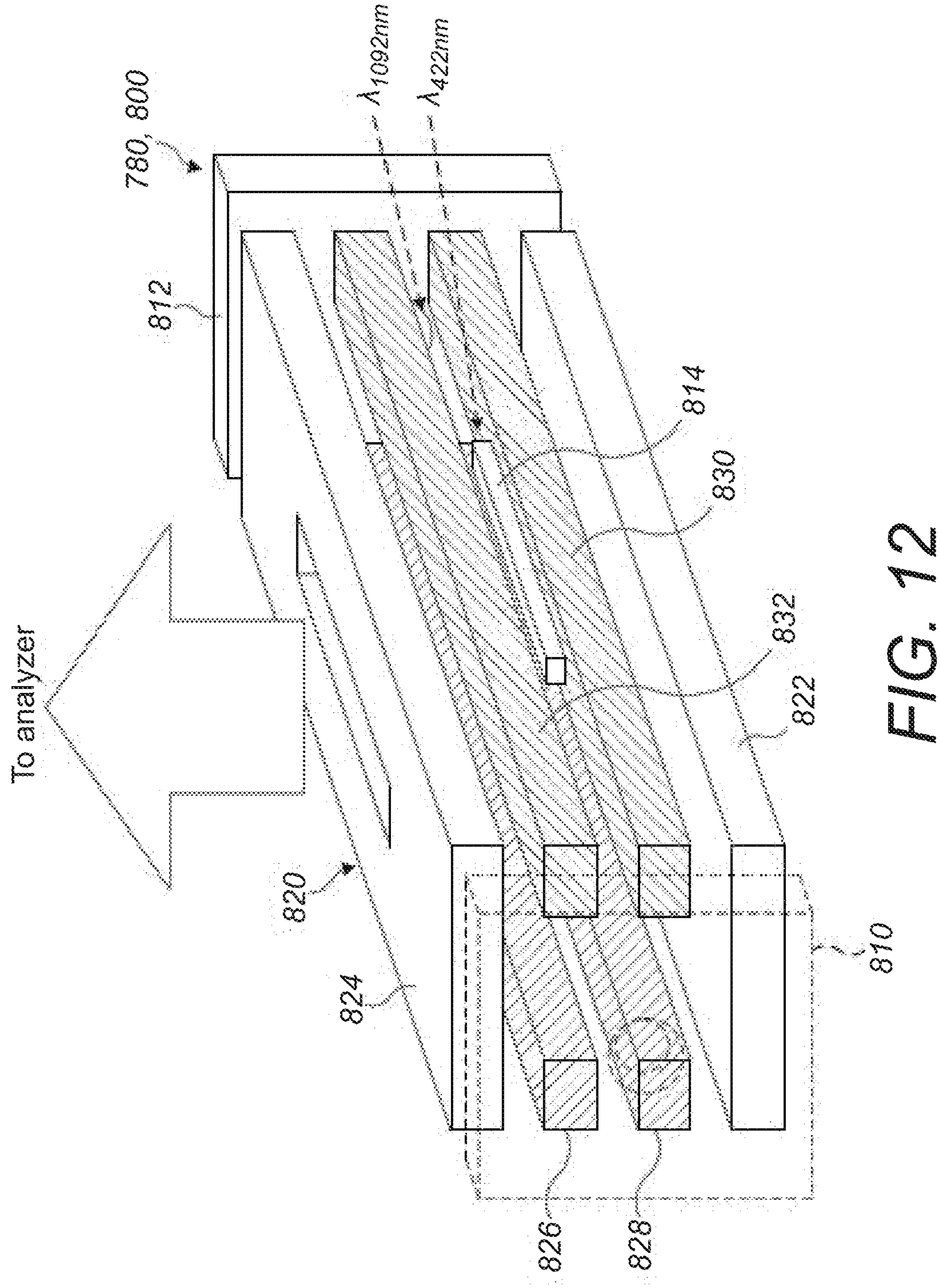
FIG. 12 shows a schematic diagram of an extraction trap suitable for use in a mass spectrometer incorporating a laser cooling process according to an embodiment of the present disclosure.

Next, an extraction trap 800 will be described in more detail which is suitable for use with the laser cooling process as described in FIG. 11. FIG. 12 shows a schematic diagram of such an extraction trap 800 suitable for use with the mass spectrometer 700 as part of a method for injecting ions into a mass spectrometer incorporating a laser cooling process.

As shown in FIG. 12 the extraction trap 800 includes a first end electrode 810 and a second opposing end electrode 812 and a multipole electrode assembly 820. The multipole electrode assembly 820 includes an elongate pull electrode 824 and an elongate push electrode 822 and first elongate split electrodes 826, 828 and second elongate split electrodes 830, 832. The extraction trap 800 also incorporates a pin electrode 814 arranged substantially at central region of the elongate ion channel defined by the multipole electrode assembly 820. As such, the construction of the extraction trap 800 may be substantially similar to the extraction trap shown in FIG. 2 as described previously.

As shown in FIG. 12 the second elongate split electrodes 830, 832 are also spaced apart in order to allow radiation from one or more lasers to pass into the central region of the elongate ion channel. Alternatively and/or additionally, an aperture in the second end electrode 820 may be provided to allow radiation from one or more lasers to pass into the central region of the elongate ion channel. It will be appreciated that the extraction trap may be configured in a number of arrangements to allow laser radiation to irradiate the central region of the elongate ion channel by positioning the laser sources providing the radiation in a number of different positions which will be readily apparent to the skilled person. As such, it will be understood that laser radiation may be provided in any direction in which that there is a line of sight to the central region of the elongate ion channel.

A method for injecting analyte ions into a mass analyser including a laser cooling process will now be described with reference to the mass spectrometer 700 shown in FIG. 11 and the extraction trap 800 shown in FIG. 12.

A controller (not shown) may be configured to control the ESI source 720, the counter ion source 710 and the ion transportation means to inject both counter ions and analyte ions into an extraction trap 780 in a manner substantially as described previously for the previous embodiments. Once both the ions analyte ions and the counter ions are confined within the extraction trap 780, 800 the controller may be configured to cause the laser cooling apparatus 705 to irradiate the elongate ion channel of the extraction trap 780, 800 by one or more lasers in order to rapidly cool the counter ions. This process in turn results in a rapid cooling of the analyte ions as a result of kinetic energy transfer from the analyte ions to the counter ions. Preferably, the controller is configured to cause the laser cooling apparatus 705 to perform a laser cooling process for at least 0.1 ms, or more preferably at least 0.5 ms, or more preferably at least 1 ms. A minimum laser cooling time limit may be provided in order to ensure that sufficient kinetic energy transfer from the analyte ions will occur. Preferably the laser cooling process lasts for no greater than 1000 ms, or more preferably no greater than 500, 400, 200 or 100 ms. An upper limit on the laser cooling process duration may be imposed in order to reduce and/or prevent interactions between the counter ions and the analyte ions (for example chemical reactions). Once the laser cooling process has finished the controller may be configured to cause the analyte ions to be injected into the mass analyser for analysis in a manner substantially as described above. As a result of the reduced spatial distribution of the analyte ions, the injection efficiency/transmission efficiency of the analyte ions into the mass analyser may be improved.

Embodiments of this disclosure incorporating a laser cooling process for the reduction of space charge may use counter ions counter ions of an opposing charge to the analyte ions or alternatively, of the same charge as the analyte ions.

In one embodiment, counter ions of the same charge as the analyte ions may be co-trapped in the extraction trap 780, 800. In this alternative embodiment, the counter ions may be confined in the elongate ion channel of the extraction trap 780 by the first and/or second DC potential. As the counter ions are of the same charge as the analyte ions, the counter ions may be injected into the extraction trap simultaneously with the analyte ions using the same ion injection optics. In this embodiment it is particularly preferred that the counter ions of the same charge as the analyte ions are of a lower mass to charge ratio than the analyte ions. Preferably, the counter ions have a mass to charge ratio of no greater than 30%, or no greater than 25%, or no greater than 20% of the mass to charge ratio of the analyte ions. For example, $Sr^+$ ions may be used as a counter ion in this embodiment. By using counter ions with a relatively low mass to charge ratio the counter ions may be relatively rapidly cooled by the laser cooling process such that kinetic energy is rapidly transferred from the analyte ions to the counter ions. Accordingly, the analyte ions may be cooled at a faster rate than would be possible by interactions with a cooling gas alone. As such, the cooling of the counter ions can be used to reduce the energy density of the analyte ions within the extraction trap and thereby bring about a reduction in the spatial distribution of the analyte ions.

In the case where the analyte ions and the counter ions are of the same charge, it is noted that it is preferable for the counter ions to be of a relatively lower mass to charge ratio than the analyte ions. Accordingly, upon ejection of the analyte ions from the extraction trap, the counter ions may be ejected along with the analyte ions. Thus, the mass spectrometer 700 may include a further mass filter (not shown) between the extraction trap 780 and the mass analyser 790 for filtering the counter ions. Alternatively, as the mass of the counter ions may be known prior to the mass analysis, this mass may be disregarded from mass analysis measurements performed by the mass analyser.

The extraction trap may be provided with a collision gas within the vacuum chamber of the extraction trap. Alternatively, the extraction trap may be provided without a collision gas and/or a means for removing a collision gas for carrying out a laser cooling process. For example, the extraction trap may be provided with a solenoid pulse valve in order to control the admission of collision gas to the extraction trap. Cooling gas may be removed from the extraction trap by one or more vacuum pumps. As such, by preventing admission of collision gas to the extraction trap by operating a solenoid pulse valve the one or more vacuum pumps of the mass spectrometer 700 may reduce the pressure inside the extraction trap below a typical collision gas pressure. Preferably, the pressure inside the extraction trap during a laser cooling process may be less than $1\times10^{-3}$ mBar. More preferably, the pressure inside the extraction trap during a laser cooling process may be no greater than: $1\times10^{-4}$ mBar, $5\times10^{-5}$ mBar, or $2\times10^{-5}$ mBar during the laser cooling process. By reducing the pressure inside the extraction trap, the number of collisions between the analyte ions, the counter ions and the cooling gas may be reduced. By reducing the number of collisions occurring between the collision gas and the ions within the chamber heating effects occurring as a result of interactions between the collision gas and the ions may be avoided, thereby increasing the cooling efficiency of the counter ions. Thus, the process for reducing the spatial energy distribution of the analyte ions may be more efficient.

It will be appreciated from the schematic diagrams shown in FIGS. 11 and 12 that the laser cooling process may be incorporated into any one of the embodiments of the extraction traps described as part of this disclosure. As such, the laser cooling process described according to this embodiment may be used to further improve the space charge reduction effects of the other extraction traps. Alternatively, the laser cooling process may be used as described in this embodiment without confinement of analyte ions and counter ions in a plurality of potential wells. As such, it will be understood that the kinetic energy reduction of the analyte ions also brings about a reduction in the space charge of the analyte ions confined in an extraction trap thereby resulting in an improved injection into a mass analyser 790.

Figure 13A:
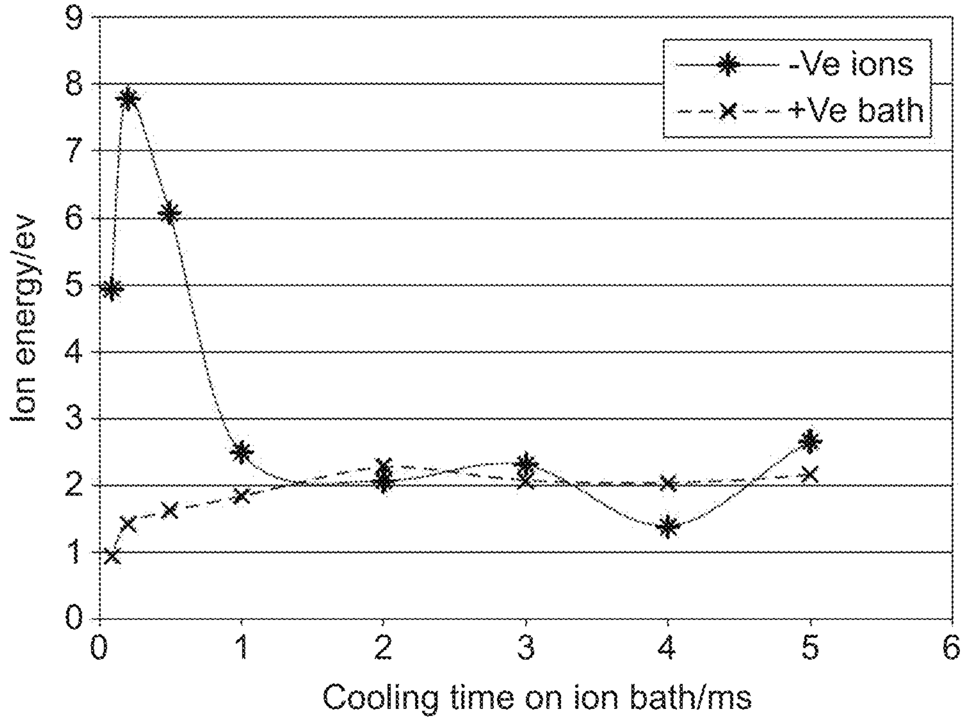
FIGS. 13A and 13B show a simulation of the behaviour of a plurality of relatively energetic analyte ions trapped within an extraction trap with a plurality of relatively cool (low energy) counter ions.
Figure 13B:
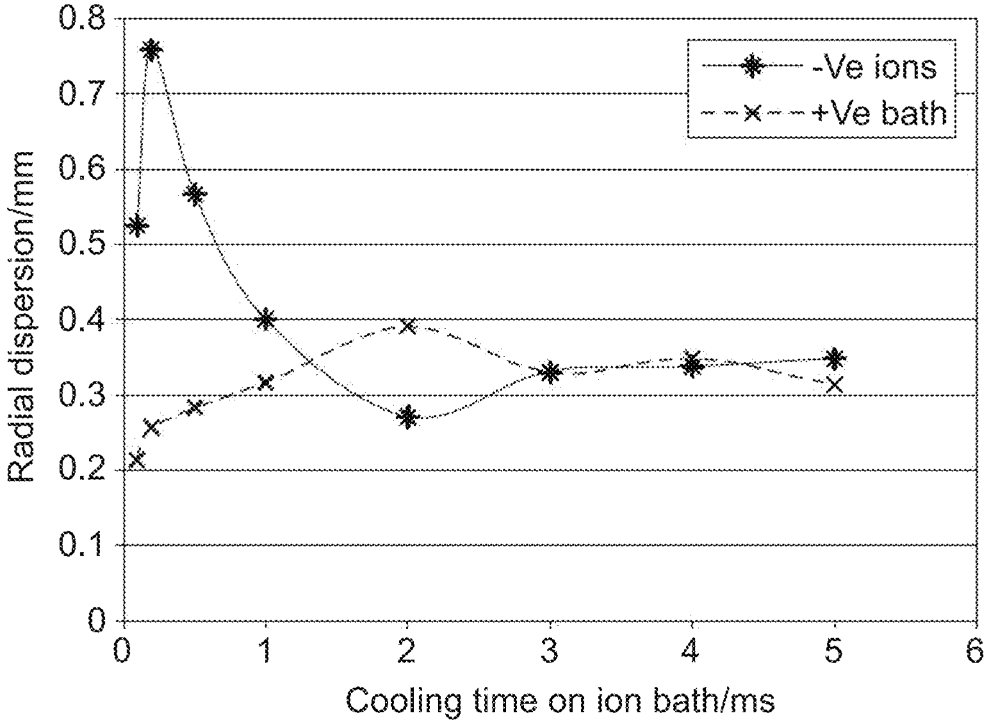

FIGS. 13A and 13B show a simulation of the behaviour of a plurality of relatively energetic negatively charged analyte ions which are cooled within a 2 mm radius linear extraction trap in the presence of 5 times the number of positively charged counter ions. According to the simulation, the counter ions are of significantly lower energy than the analyte ions such that the simulation is representative of a laser cooling process according to this disclosure. As shown in the simulation, analyte ions are initially of relatively high energy and radial (spatial) distribution. Over a short time period, energy is transferred from the analyte ions to the counter ions and the spatial distribution of the analyte ions is reduced. For example, according to the simulation, the ion energy can be seen to equilibrate in about 1 ms, which is suitable for extraction to reasonably fast analysers (<1 kHz repetition rate).

Advantageously the present disclosure may be used to provide a method of injecting analyte ions into a mass spectrometer, which reduces the effect of space charge on the analyte ions. By reducing space charge effects, it may be possible to reduce the overall size of the extraction trap such that a smaller elongate ion channel may be provided. Thus, a smaller mass spectrometer may be provided. Alternatively, the reduction in space charge may be utilised to allow a higher density of ions to be confined within an extraction trap of a given size such that the number of ions injected into a time of flight mass analyser may be increased, thereby resulting in an improvement in resolution. The present disclosure also covers mass spectrometers and a controller for a mass spectrometer in which ion injection into a mass analyser may be improved.

It will be appreciated that the present disclosure is not limited to the embodiments described above and that modifications and variations on the embodiments described above will be readily apparent to the skilled person. Features of the embodiments described above may be combined in any suitable combination with features of other embodiments described above as would be readily apparent to the skilled person and the specific combinations of features described in the above embodiments should not be understood to be limiting.

What is claimed is:

1. A method of injecting analyte ions into a mass analyser comprising:

injecting analyte ions of a first charge into an ion trap;

injecting counter ions of a second charge into the ion trap;

cooling the analyte ions and the counter ions simultaneously in the ion trap during a cooling time period such that a spatial distribution of the analyte ions in the ion trap is reduced, wherein a time duration of the cooling time period is not greater than a time period during which reactions of the analyte ions with the counter ions are limited to a pre-determined minor proportion of the analyte ions; and injecting the analyte ions as an ion packet from the ion trap into the mass analyser.

2. A method according to claim 1 wherein:

the second charge is of an opposite polarity to the first charge.

3. A method according to claim 2 wherein the ion trap comprises:

an elongate multipole electrode assembly comprising elongate multipole electrodes arranged to define therein an elongate ion channel into which the analyte ions and the counter ions are injected.

4. A method according to claim 3 wherein:

the analyte ions and the counter ions are radially confined within the elongate ion channel by a pseudopotential well formed by applying an RF potential to the elongate multipole electrodes.

5. A method according to claim 3 wherein:

the analyte ions are axially confined within the elongate ion channel by a first potential well; and the counter ions are axially confined within the elongate ion channel by a second potential well.

6. A method according to claim 5 wherein the first potential well is defined by a first DC bias applied to at least one first electrode positioned between the elongate multipole electrodes and positioned adjacent a central region of the elongate ion channel.

7. A method according to claim 5 wherein:

the second potential well is defined by a second DC bias applied at opposing ends of the elongate ion channel with respect to the elongate multipole electrodes, the second DC bias of the same polarity as the first DC bias.

8. A method according to claim 5 wherein:

a magnitude of the second potential well is greater than a magnitude of the first potential well.

9. A method according to claim 1 wherein:

the analyte ions are cooled in the ion trap prior to the injection of the counter ions.

10. A method according to claim 1, further comprising:

determining the number of analyte ions injected into the ion trap;

wherein a number of counter ions to be injected into the ion trap is determined based on the determined number of analyte ions.

11. A method according to claim 10 wherein:

the counter ions injected into the ion trap have a mass to charge ratio (m/z) of no greater than 300 or 250 or 200 amu.

12. A method according to claim 11 further comprising:

determining an average mass to charge ratio of the analyte ions to be injected into the ion trap; and if the average mass to charge ratio of the analyte ions is at least 2 times the mass to charge ratio of the counter ions, the number of counter ions to be injected into the ion trap is determined such that a total charge of the counter ions exceeds the total charge of the analyte ions.

13. A method according to claim 1 wherein:

the number of counter ions to be injected into the ion trap is determined such that a total charge of the counter ions is no greater than a total charge of the analyte ions.

14. A method according to claim 1 wherein:

the time duration of the simultaneous cooling of the analyte ions and the counter ions in the ion trap is not greater than 2 ms.

15. A method according to claim 1 wherein:

the analyte ions are injected into the ion trap from one axial end of the ion trap; and the counter ions are injected into the ion trap from the other axial end of the ion trap.

16. A method according to claim 1 wherein:

the analyte ions are generated by a first ion source prior to injection into the ion trap; and the counter ions are generated by a second ion source prior to injection into the ion trap.

17. A method according to claim 1 wherein:

the counter ions are cooled in the extraction trap by a laser cooling apparatus, which in turn cool the analyte ions by a transfer of kinetic energy.

18. A method according to claim 17 wherein:

the counter ions are injected into the extraction trap simultaneously with the analyte ions.

19. A method according to claim 1 wherein:

the mass analyser is a Fourier transform mass analyser or a time of flight mass analyser.

20. A mass spectrometer controller for controlling an ion trap to inject a packet of analyte ions from the ion trap into a mass analyser, the controller configured:

to cause at least one ion source to inject an amount of analyte ions of a first charge into the ion trap and to inject an amount of counter ions of a second charge into the ion trap;

to cause the ion trap to simultaneously cool the analyte ions and the counter ions in the ion trap during a cooling time period in order to reduce the spatial distribution of the analyte ions in the ion trap, wherein a time duration of the cooling time period is not greater than a time period during which reactions of the analyte ions with the counter ions are limited to a pre-determined minor proportion of the analyte ions; and to cause the ion trap to inject the analyte ions from the ion trap into the mass analyser.

21. A mass spectrometer controller according to claim 20 wherein:

the second charge is of an opposite charge to the first charge.

22. A mass spectrometer controller according to claim 21 wherein the mass spectrometer controller is further configured to control the ion trap to:

apply an RF potential to elongate multipole electrodes extending in an axial direction to radially confine analyte ions and counter ions in an elongate ion channel; and apply a first DC bias to at least one first electrode within the elongate ion channel to confine the analyte ions within the elongate ion channel in a first potential well; and apply a second DC bias to opposing ends of the ion trap to confine the counter ions axially within the elongate ion channel by a second potential well.

23. A mass spectrometer controller according to claim 20 wherein: the controller is configured to cause the ion trap to cool the analyte ions in the ion trap prior to the injection of the counter ions.

24. A mass spectrometer controller according to claim 20 wherein:

the controller is configured to cause the ion trap to simultaneously cool the analyte ions and the counter ions for a cooling time period duration of not greater than 2 ms.

25. A mass spectrometer controller according to claim 20 wherein:

the controller is configured to cause a laser cooling apparatus to cool the counter ions in the extraction trap which in turn cool the analyte ions by a transfer of kinetic energy.

26. A mass spectrometer comprising:

a mass analyser;

an ion trap;

at least one ion source configured to inject analyte ions of a first charge into the ion trap and counter ions of a second charge into the ion trap; and a mass spectrometer controller for controlling the ion trap to inject a packet of the analyte ions from the ion trap into the mass analyser, the controller configured:

to cause at least one ion source to inject an amount of analyte ions of a first charge into the ion trap and to inject an amount of counter ions of a second charge into the ion trap;

to cause the ion trap to simultaneously cool the analyte ions and the counter ions in the ion trap during a cooling time period in order to reduce the spatial distribution of the analyte ions in the ion trap, wherein a time duration of the cooling time period is not greater than a time period during which reactions of the analyte ions with the counter ions are limited to a pre-determined minor proportion of the analyte ions; and to cause the ion trap to inject the analyte ions from the ion trap into the mass analyser.

27. A mass spectrometer according to claim 26 wherein:

the mass analyser is a Fourier transform mass analyser or a time of flight mass analyser.

28. A mass spectrometer according to claim 26 wherein:

the elongate multipole electrodes comprise at least one multipole electrode assembly selected from a quadrupole, a hexapole, or an octupole.

29. A mass spectrometer according to claim 26 wherein:

a first ion source is configured to inject analyte ions of a first charge into the ion trap; and a second ion source is configured to inject counter ion of a second charge into the ion trap.

30. A mass spectrometer according to claim 29 wherein:

the first and second ion sources are configured to inject the analyte ions and counter ions into the ion trap from opposing ends of the ion trap.

* * * * *